United States Patent
Lam et al.

(10) Patent No.: US 8,379,055 B2
(45) Date of Patent: Feb. 19, 2013

(54) ELECTRONIC LAYOUT GENERATION BASED ON VISUAL CONTEXT

(75) Inventors: Nicole Ai Ling Lam, Lane Cove (AU); Lena Qian, Artarmon (AU)

(73) Assignee: Canon Kabushiki Kaisha, Tokyo (JP)

( * ) Notice: Subject to any disclaimer, the term of this patent is extended or adjusted under 35 U.S.C. 154(b) by 895 days.

(21) Appl. No.: 12/485,400

(22) Filed: Jun. 16, 2009

(65) Prior Publication Data
US 2009/0309894 A1    Dec. 17, 2009

(30) Foreign Application Priority Data

Jun. 17, 2008    (AU) ............................... 2008202672

(51) Int. Cl.
*G09G 5/00*    (2006.01)
(52) U.S. Cl. ...................................................... 345/629
(58) Field of Classification Search .................. 345/630
See application file for complete search history.

(56) References Cited

U.S. PATENT DOCUMENTS

| | | | |
|---|---|---|---|
| 6,236,407 B1 * | 5/2001 | Leban et al. | 345/630 |
| 6,317,128 B1 * | 11/2001 | Harrison et al. | 345/629 |
| 6,433,783 B2 * | 8/2002 | Murata | 345/440 |
| 6,486,879 B1 * | 11/2002 | Nagano et al. | 345/420 |
| 6,529,202 B2 | 3/2003 | Wu | |
| 6,594,403 B1 | 7/2003 | Bozdagi et al. | |
| 6,781,592 B2 * | 8/2004 | Murayama et al. | 345/585 |
| 6,867,788 B1 * | 3/2005 | Takeda | 345/630 |
| 6,931,591 B1 * | 8/2005 | Brown et al. | 715/205 |
| 6,961,097 B2 * | 11/2005 | Yui | 348/584 |
| 6,977,665 B2 * | 12/2005 | Yokouchi | 345/629 |
| 6,985,161 B1 * | 1/2006 | Politis | 345/629 |
| 7,024,053 B2 * | 4/2006 | Enomoto | 382/284 |
| 7,027,072 B1 * | 4/2006 | Sadowski | 345/629 |
| 7,375,769 B2 * | 5/2008 | Yui | 348/584 |
| 7,577,314 B2 * | 8/2009 | Zhou et al. | 382/284 |
| 7,609,847 B2 * | 10/2009 | Widdowson et al. | 382/100 |
| 7,800,633 B2 * | 9/2010 | Seo | 345/629 |
| 8,026,929 B2 * | 9/2011 | Naimark | 345/629 |
| 2002/0097250 A1 * | 7/2002 | Fukushima et al. | 345/629 |
| 2007/0192164 A1 | 8/2007 | Nong et al. | |

OTHER PUBLICATIONS

Alexander Kröner, "The Design Composer: Context-Based Automated Layout for the Internet" (1999).

* cited by examiner

*Primary Examiner* — Ryan R Yang
(74) *Attorney, Agent, or Firm* — Fitzpatrick, Cella, Harper & Scinto

(57) ABSTRACT

An electronically implemented method is disclosed for generating a layout for a composite image. The method starts with the steps of receiving (210) at least one content element to be included within the composite image and an external environment context image (220) indicative of the intended external environment of the composite image. The external environment context image is captured by an image capture device. Data is also received indicating the size of the composite image and/or the location of the composite image within the external environment context image. Based on the received data layout styles are generated (250) for the at least one content element based on features of the at least one content element, features of the external environment context image and the provided location of the composite image. Finally, based on the generated layout styles, the composite image (260) is generated comprising the at least one content element.

26 Claims, 25 Drawing Sheets

800

| Id | Region Type | Statistics |
|---|---|---|
| 1 | Simple | Ave. colour= yellow, |
| 2 | Object | Boundary=(20,13), (24, 15), ..., .. |
| 3 | Text | Font size= 12pt, bg=blue |

810 820 840
850 — row 1
860 — row 2
870 — row 3
845, 846, 847

Fig. 8

| Image Id | Image Type | Region List |
|---|---|---|
| 1 | Content | |
| 2 | Relevant | |
| 3 | Relevant | |
| 4 | Environment | |

Fig. 10

ELECTRONIC LAYOUT GENERATION BASED ON VISUAL CONTEXT

CROSS-REFERENCE TO RELATED PATENT APPLICATIONS

This application claims the right of priority under 35 U.S.C. §119 based on Australian Patent Application No. 2008202672, filed 17 Jun. 2008, which is incorporated by reference herein in its entirety as if fully set forth herein.

TECHNICAL FIELD

The present invention relates to image layout generation and, in particular, to methods and systems for generating layouts for composite images based on the visual context of the layout.

BACKGROUND

The traditional graphic design method involves three steps: exploration of the design concepts, review of the initial ideas, and refinement of the selected concept to make the final design product. While the exploration and the review processes rely heavily on graphic designers, the refinement method can be automated using computer systems.

In the exploration stage, the graphic designer needs to understand the purpose of the design (e.g., what is the design for) and the context of the design (e.g., where and how is the design going to be displayed). The designer further needs to collect the content of the design, including text and images, and generate multiple design concepts, using sketches, in order to create a design or a design product. The final design product is usually a composite image having a particular page layout. A graphic designer produces one or more initial page layout concepts for the content using established design principles and past experience. The initial page layouts are then evaluated by other graphic designers and/or customers. Finally, a single page layout is selected from the initial page layouts. The selected layout is refined by arranging and applying styles to the text and image content to produce the final composite image, referred to as a final page layout or layout.

There are existing computer aided design systems arranged for generating a professional looking page layout in the refinement stage. Many of these systems are template based. That is, templates designed by the graphic designers are provided to the computer system. Users set their content in the placeholders defined in the template with some flexibility to change colours or fonts.

Some more sophisticated design software programs perform an automatic layout method using constraint-based optimisation techniques. The automatic layout method starts with a layout template and content is filled in the placeholders of the template. The layout is then refined on the basis of satisfying every predetermined constraint. The focus of the automatic layout methods is to optimise the refinement method of the initial page layout.

Other systems are available that are directed to generating an initial page layout. Some of these systems allow users to select a template; others automatically suggest a template from user's requirements. Since a layout template is authored without knowing the external environment context of the new layout design, the resulted designs could be inadequate. For example, a composite image page's background of which is formed by a red colour may be inappropriate because the wall where the image will be displayed is red. In this instance, the wall is considered to define the external environment context of the composite image and its page layout. In some of the systems, after a layout has been generated, colours used in the layout can be adapted to some aspects of the environment context. However, these available systems are ineffective and lack flexibility. One such automatic layout system generates composite images depending on the display context, e.g. display device size. For example, the layout generated for an HTML page that is to be displayed on a computer monitor, is different from the layout generated for displaying on a mobile phone screen. However, visual context (i.e., external visual features associated with the page layout to be designed) is not considered in creating the page layout.

SUMMARY

According to one aspect of the present invention, there is provided an electronically implemented method for generating a layout for a composite image, the method comprising the steps of;

receiving at least one content element to be included within the composite image;

receiving an external environment context image indicative of the intended external environment of the composite image, the external environment context image being captured by an image capture device;

receiving data indicating at least one of a size of the composite image and a location of the composite image within the external environment context image;

generating layout styles for the at least one content element based on features of the at least one content element, features of the external environment context image and a provided location of the composite image; and generating the layout for the composite image, the layout comprising the at least one content element, based on the generated layout styles.

According to a second aspect of the present invention, there is provided an electronic system for generation of a composite image, the system comprising;

communication means for receiving at least one content element;

communication means for receiving an external environment context image indicative of the intended external environment for the composite image, the external environment context image being captured by an image capture device;

communication means for receiving data indicating at least one of a size of the composite image and a location of the composite image within the external environment context image;

processing means for generating layout styles for the at least one content element within the composite image, based on features of the at least one content element, features of the external environment context image and a provided location of the composite image; and processing means for generating the layout for the composite image, the layout comprising the at least one content element based on the layout styles.

Another aspect provides a computer program product having recorded thereon a computer program for performing the method of the first aspect.

Further aspects are also disclosed.

BRIEF DESCRIPTION OF THE DRAWINGS

At least one embodiment of the present invention will be described with reference to the drawings, in which:

FIG. 8 is a region list table for regions returned from the image segmentation unit.

FIG. 10 is an image region table listing regions extracted from different types of images.

DETAILED DESCRIPTION INCLUDING BEST MODE

The present disclosure aims to provide a method of automatically creating page layouts for composite images based on the visual context within which the images would be viewed. A page layout is the spatial organisation of graphic objects. Examples of graphic objects include an image, line art, graph or text. Stylistic features of an image may include colour and texture of the image. The text images are associated with styles that can include the colour and the font of the text. The page layout creation method involves creating graphic objects from raw content, such as text, and arranging the graphic objects based on their size, position and style.

The visual context is partially defined by an external environment context image that shows the intended external environment of the image, which may include the physical location and background on which the composite image is to be displayed. The visual context of an image may also include a number of context images (hereinafter referred to as relevant context images) that have some relevance to the content of the page layout. The external environment context image is only a contextual reference and is not used directly in the page layout. However, one or more of the relevant context images may be used either as a whole (for instance as a background) or in part, in the composition of the page layout.

The method for creating layouts of composite images based on the visual context of the layout will now be disclosed with reference to the figures listed above.

System Implementation

Figure 1:
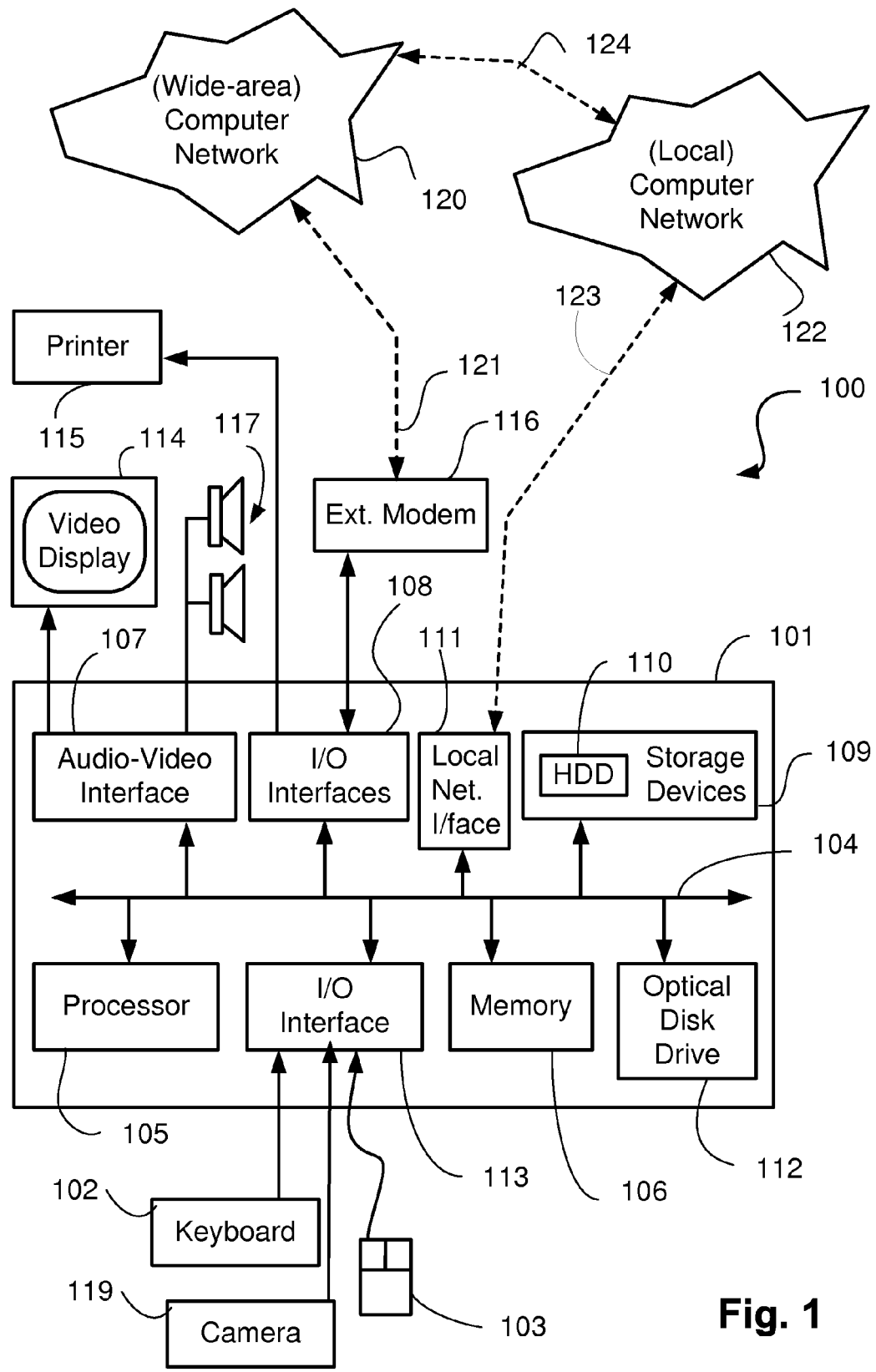
FIG. 1 is a schematic diagram of a computer system on which the proposed method can be practiced.

The discussed method for image layout generation can be electronically implemented either by way of a computer system 100, shown in FIG. 1, or in a dedicated image generation device (not shown). The following description discusses mainly the hardware associated with computer implementation of the proposed method. However, it will be appreciated that a method implemented in a dedicated image processing device would be conceptually similar in both its implementation steps and hardware requirements.

The steps of the discussed method may be implemented by way of one or more application programs executable within either the computer system 100 or a respective dedicated image processing device (not shown in FIG. 1). In particular, the various steps of the method are effected by software instructions carried out either within the computer system 100 or in a respective image processing device. The instructions may be formed as one or more code modules, each for performing one or more particular tasks. The software may also be divided into two separate parts, in which a first part and the corresponding code modules perform the described method. A second part and the corresponding code modules manage a user interface between the first part and the user. The software may be stored in a computer readable medium, including the storage devices described below.

The executable software is loaded into the computer system 100 from the computer readable medium, and then executed by the computer system 100. A computer readable medium having such executable software or computer program recorded on it is a computer program product. The computer readable medium may, for example, include a compact disc (CD) or a digital video disc (DVD), which may be read on the optical disc drive 112. The use of the computer program product in the computer system 100 preferably effects the advantageous method for generating image layouts based on the visual context of the layout, the specific method being described hereinafter. The software may also be permanently residing on an internal hard drive 110 of the computer system 100 or an equivalent dedicated image processing device.

As seen in FIG. 1, the computer system 100 is formed by a computer module 101, input devices such as a keyboard 102, a mouse pointer device 103 and a camera 119, and output devices including a printer 115, a display device 114 and loudspeakers 117. An external Modulator-Demodulator (Modem) transceiver device 116 may be used by the computer module 101 for communicating to and from a communications network 120 via a connection 121. The network 120 may be a wide-area network (WAN), such as the Internet, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the network 120.

The computer module 101 typically includes at least one processor unit 105, and a memory unit 106, for example formed from semiconductor random access memory (RAM) and read only memory (ROM). The module 101 also includes a number of input/output (I/O) interfaces including an audio-video interface 107 that couples to the video display 114 and loudspeakers 117, an I/O interface 113 for the keyboard 102, mouse 103 and an optional joystick (not illustrated), as well as an interface 108 for the external modem 116 and printer 115. In some implementations, the modem 116 may be incorporated within the computer module 101, for example within the interface 108. The computer module 101 also has a local network interface 111 which, via a connection 123, permits coupling of the computer system 100 to a local computer network 122, known as a Local Area Network (LAN). As also illustrated, the local network 122 may also couple to the wide network 120 via a connection 124, which would typically include a so-called "firewall" device or similar functionality. The interface 111 may be formed by an Ethernet™ circuit card, a wireless Bluetooth™ or an IEEE 802.11 wireless arrangement.

The interfaces 108 and 113 may afford both serial and parallel connectivity, the former typically being implemented according to the Universal Serial Bus (USB) standards and having corresponding USB connectors (not illustrated). One or more storage devices 109 are provided and typically include a hard disk drive (HDD) 110. Other devices, such as a floppy disk drive and a magnetic tape drive (not illustrated), may also be used. An optical disk drive 112 is typically provided to act as a non-volatile source of data. Portable memory devices, such optical disks (e.g., CD-ROM, DVD), USB-RAM, and floppy disks for example may then be used as appropriate sources of data and instructions to the system 100.

The components 105 to 113 of the computer module 101 typically communicate via an interconnected bus 104 and in a manner which results in a conventional mode of operation of the computer system 100 known to those in the relevant art. Examples of computers on which the described arrangements can be practised include IBM-PC's and compatibles, Sun Sparcstations, Apple Mac™ or alike computer systems evolved therefrom.

Typically, the application programs implementing the discussed method for generating layouts, as well as any intermediate processing and calculation results produced during the various steps of the method, are resident on the hard disk drive 110 and are read, processed and controlled and/or executed by the processor 105. Intermediate storage of such programs and any data fetched from the networks 120 and 122 may be accomplished using the semiconductor memory 106, possibly in concert with the hard disk drive 110. In some instances, the application programs may be supplied to the user encoded on one or more CD-ROM and read via the corresponding drive 112, or alternatively may be read by the user from the networks 120 or 122. Still further, the software can also be loaded into the computer system 100 from other computer readable media. Computer readable storage media refers to any non-transitory storage medium that participates in providing instructions and/or data to the computer system 100 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of (transitory) computer readable transmission media that may also participate in the provision of instructions and/or data include radio or infrared transmission channels as well as a network connection to another computer or networked device, and the Internet or Intranets including e-mail transmissions and information recorded on Websites and the like.

If necessary, application programs and the corresponding code modules may be executed to implement one or more graphical user interfaces (GUIs) to be rendered or otherwise represented upon the display 114. Through manipulation of the keyboard 102 and the mouse 103, a user of the computer system 100 and the application may manipulate the interface to provide controlling commands and/or input to the applications associated with the GUI(s).

In the case of a dedicated image processing device, the proposed method for layouts generation may also be implemented by a dedicated hardware module. Such a module may include digital signal processors, graphic processors or one or more microprocessors and associated memory modules. Furthermore, the module may include image acquisition device, such as the digital camera 119. The image acquisition device may be used for obtaining an image of the external environment, which hereinafter will be referred as external environment context image. This image may then be taken into account in the design of the generated image layout, as will be described below.

Description of the Method

Figure 2:
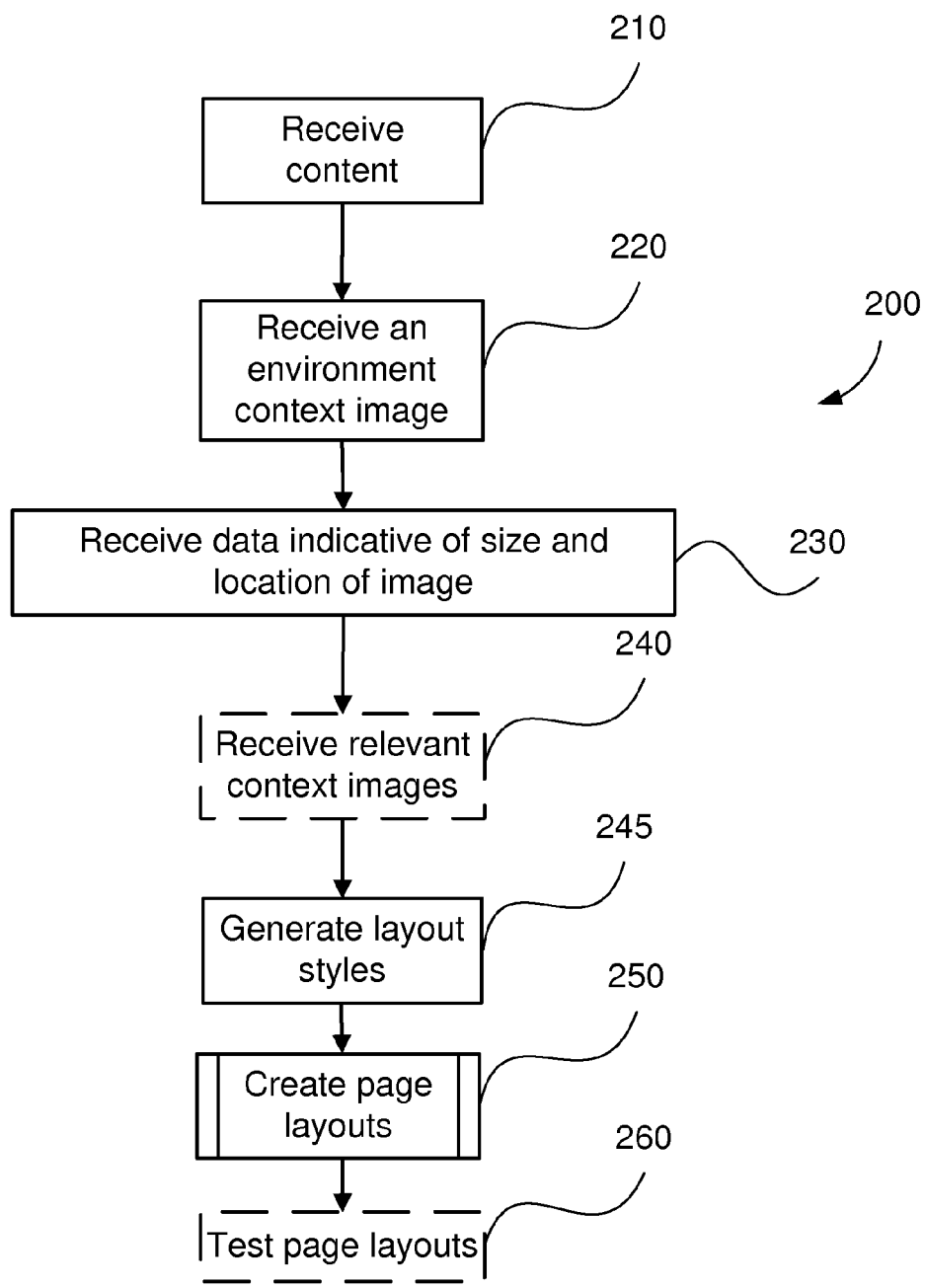
FIG. 2 is a schematic flowchart showing a method of automatic page layout generation according to the present disclosure.

FIG. 2 illustrates a flowchart 200 for the method of creating a layout of a composite image using the visual context for the image, wherein the visual context includes the external environment context of the image. The method starts at step 210 where the processor 105 of the electronic system 100 for the generation of the composite image layout receives from the user content images and/or text that will be included in the page layout. At step 220, the processor 105 receives from the user an external environment context image, indicative of the intended external environment on the background of which the designed layout is going to be viewed. The external environment context image may be captured by the digital camera 119 or another image acquisition device. At step 230, the processor 105 receives from the user data of the location of the page layout on the external environment context image and of an approximate size of the page layout, e.g., 30 cm width and 40 cm height, via a graphic user interface, utilising display 114, keyboard 102 and mouse 103. It is envisaged that, in case of a relatively uniform external environment context image, the precise location of the page layout within the external environment context image may not be considered essential and the only provided data may be that of the size of the page layout.

At step 240, the processor 105 may receive from the user one or more relevant context images which will be used to extract information to produce the page layout. This step is optional, as indicated by the dotted outline. The context images may be stored on storage devices 109 and 110 or external disc drives, such as optical disc drive 112.

In the present methods, a search engine or other method could be used to retrieve relevant context images from a database or semantic web with user provided keywords. The data bases could be stored on LAN 122 or WAN 120. In step 245, the processor 105 generates one or more page layouts for the given content based on features of at least one of the content elements, features of the external environment context image and/or the provided location of the composite image. Styles extracted from any provided relevant context images may also be used for this purpose. In step 250, the processor 105 creates one or more page layouts for the given content based on the styles generated in step 145.

As more than one page layout can be produced at step 250, each page layout may be sent by processor 105 to a user for evaluation, at the optional step 260. Step 260 usually includes the processor 105 presenting each generated page layout on the background formed by the external environment context image and allowing the user to review the proposed layout. The step of presenting the image can be effected by the processor 105 displaying the proposed image layout on the display device 114 or by printing the image on the printer 115. The best layout is thus selected by the candidate.

Content Elements

Each image or text specified in the content is called a content element or element. Any non-text content element is defined as an image content element, e.g., a photographic image, line art, or clipart. While providing the content in step 210, the user can specify the order and the emphasis of the content elements in the final page layout.

The emphasis of the element indicates the level of importance that the user wants to convey to the viewer of the page layout. The values of emphasis considered here are A, B, C, and D, where A has the highest level of emphasis and D has the lowest emphasis. One or more content elements can have the same emphasis. Whilst the order of the content elements describes which content element is laid out first and which content element is laid out last, the emphasis specifies to what degree each content element is highlighted and does not correspond to the order of the elements.

Figure 3:
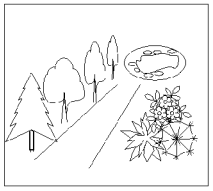
FIG. 3 is an example of a content table for a page layout.

An example of content elements to be included in an image layout is shown in a content table 300 in FIG. 3. There are three columns in the content table: content element 320, element type 330 and element emphasis 340. There are four text content elements; 350, 370, 380 and 390, and one image content element 360. Text content 370 is marked with emphasis A, which means that it needs to be the most eye-catching element. While the image content element 360 and the text content element 350 have emphasis B and C, respectively, text content elements 380 and 390 have the lowest emphasis D. The order of the content elements is the order of rows in the content table shown in FIG. 3.

The styles that affect the visual properties of the content are called layout styles. No matter where a content element is laid out, its emphasis can be changed by layout styles.

The emphasis is an important factor for the layout method to determine what layout styles to use. Usually, a big font draws the viewer's attention. However, the emphasis due to a style is not inherent, but depends on the style itself, the background, the layout and so on. For example, even text with a big font can remain unnoticed if the text colour has very little contrast with the text's background colour. More detailed discussion of this issue is provided further in the text.

External Environment Context Image

The external environment context image utilised at step 220, is an important input for creating a page layout according to the described method. To make a page layout stand out from a background colour or surrounding colours, the page layout must avoid using those colours. For example, if an advertisement is to be placed in a big sign board in front of trees, the page layout of the advertisement must not have a background with the tree colour, e.g., green colour. Thus, the external environment context image provides restrictions on selecting the layout styles.

Figure 4:
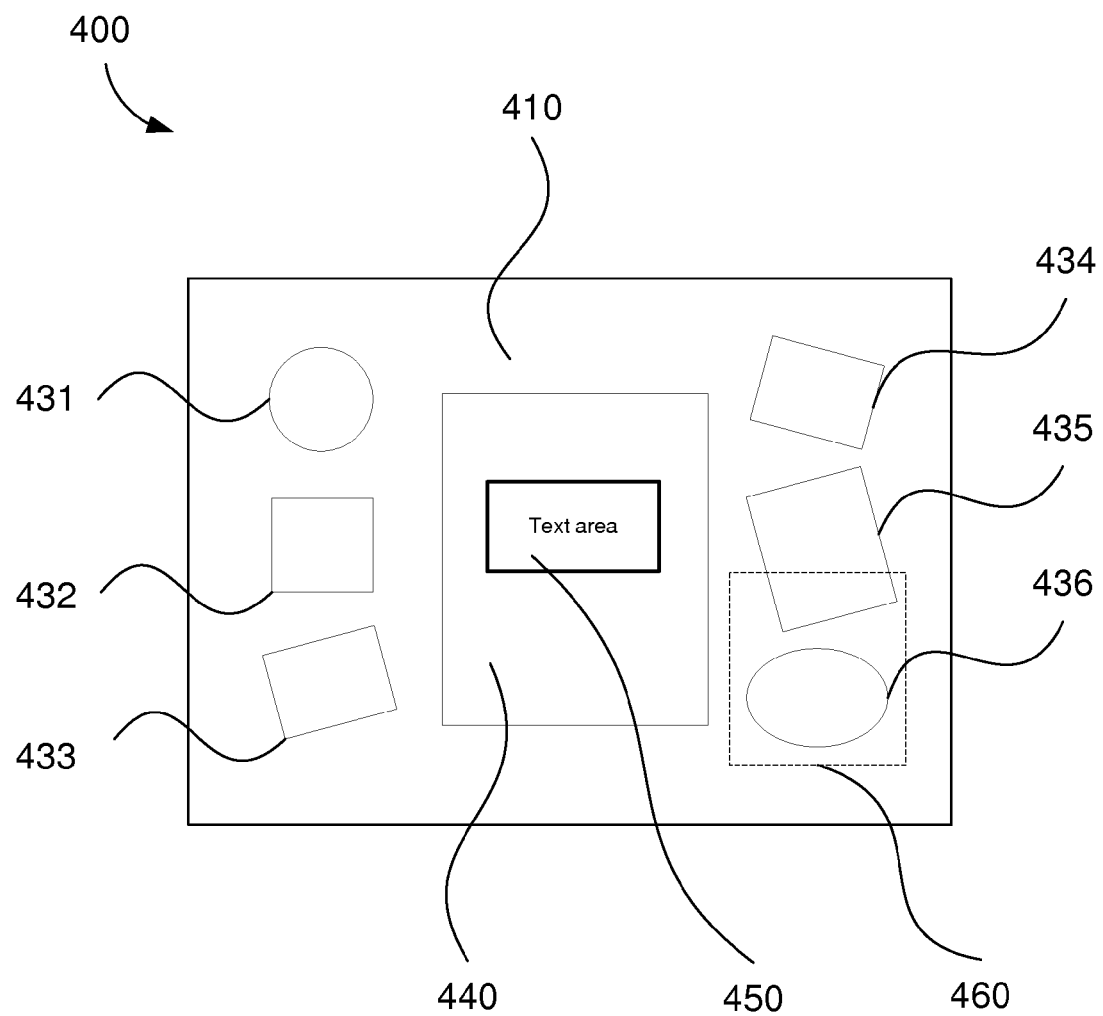
FIG. 4 is an example of an external environment context image.

As indicated above, the external environment context image indicates the environmental background in which the page layout is going to be displayed and viewed. The external environment context image could be a photograph of a wall, a noticeboard or a window of a shop. FIG. 4 shows an external environment context image in the form of a noticeboard 400. The noticeboard 400 has a background 410. Six stickers 431, 432, 433, 434, 435 and 436 and an A4 page 440 with some text 450 are pinned to the noticeboard. The box with dotted line 460 indicates both the location of the designed composite image layout and the size of the area of the layout. The associated data is provided by the user to the electronic system 100 in step 230.

Relevant Context Image

Figure 5:
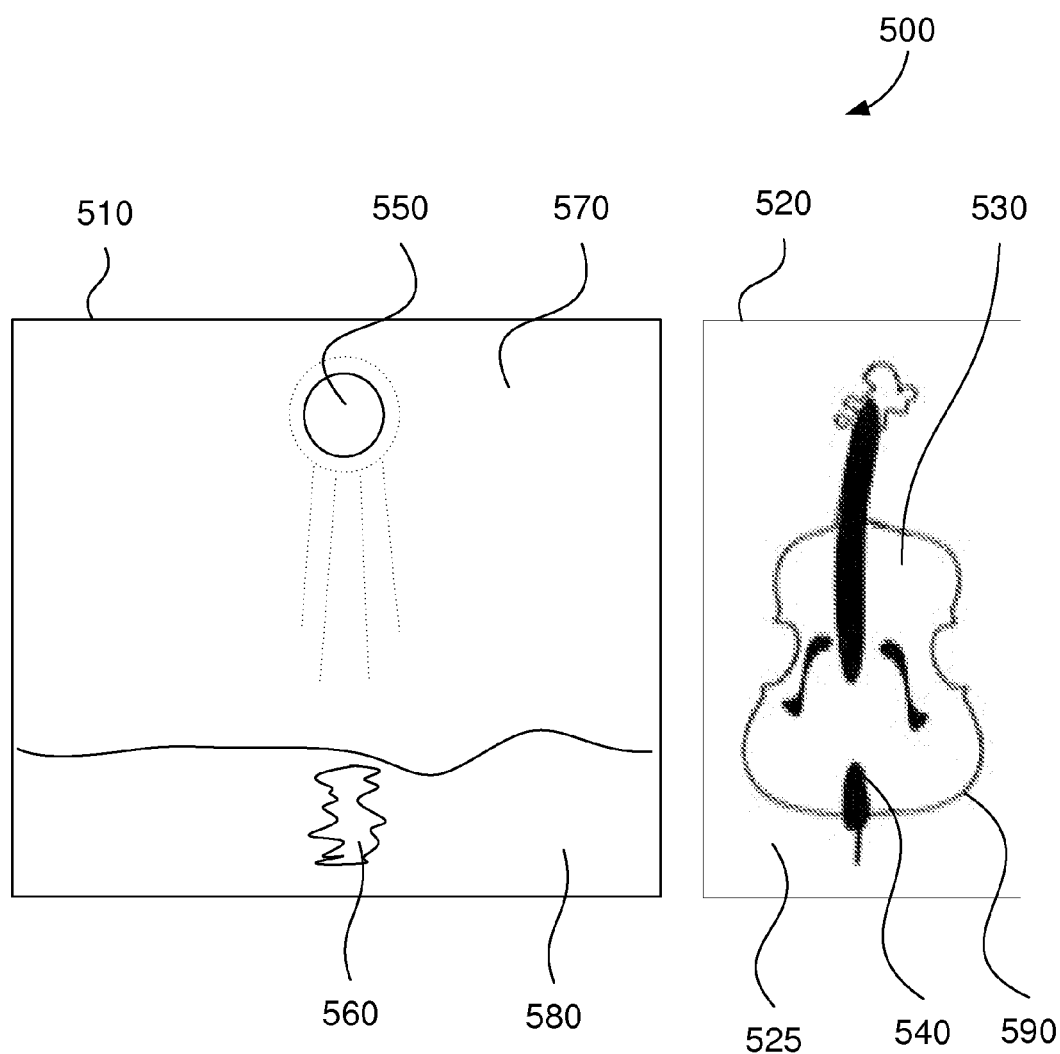
FIG. 5 shows two examples of relevant context images.

The relevant context images that may be received by the processor 105 from the user in step 240 are a kind of visual context that can be directly used or indirectly applied as layout styles to the content. FIG. 5 illustrates two relevant context images 500. Image 510 shows a moonlight scene which is related to the expression "Moonlight" from text 370. Image 520 is another relevant context image that depicts a cello 590 which is related to "String Concert" from the same text 370. In the relevant context image 510, the top part 570 depicts sky and the bottom part 580 depicts water. Label 550 indicates the moon, while the water reflection of the moonlight is labelled as 560. In the relevant context image 520, label 590 is used to identify the boundary of the whole cello, while labels 530 and 540 mark parts of the cello, and label 525 identifies the background of the image.

The one or more styles generated by the processor 105 for the page layout of the newly designed composite image that is to be located at 460, may at least partially be based on features of the relevant context images. The style includes attributes such as colour and shape. For example, the font colour of a text content element of the designed image can be set to the colour of the cello 520. It is to be noted that, whilst the described method does not include the step of recognising the cello 520, its boundary and colours are considered during the step 245 of creating layout styles.

Now steps 245 and 250 from FIG. 2 are described in detail with reference to FIG. 6. The method of creating page layouts 600 in FIG. 6 starts with a decision step 605 in which the processor 105 verifies whether there is an image received in steps 210, 220 and 240. If there is an image, the processor continues to step 610. Otherwise, the execution continues with step 620.

Step 610 extracts regions from the selected received image. After the regions are extracted, the processor 105 returns to step 605 to verify whether there are further images to process. All selected images are marked so that they will not be selected again.

Step 620 creates layout styles based on the image regions extracted in step 610 and, thus, effects step 245. Then, step 630 selects an appropriate image as the background image of the new layout. Step 640 lays out the content of the layout.

After a page layout is created, in step 650 processor 105 checks for other potential background images which were not examined in step 630. If there are any images left to process, the processor 105 goes back to 630. Otherwise, the method terminates at step 699. At this stage the entire image layout has been generated and step 250 of FIG. 2 has been effected.

Further details of step 610, 620, 630 and 640 will be described further in the text in relation to FIGS. 7B, 12, 13 and 15A, respectively.

Extracting Image Regions

The main task of extracting image regions at step 610 from an image obtained in 210, 220 or 240 is to segment the image into a list of regions associated with the image. Thus, a preferred implementation employs image segmentation techniques to extract image regions.

Figure 7A:
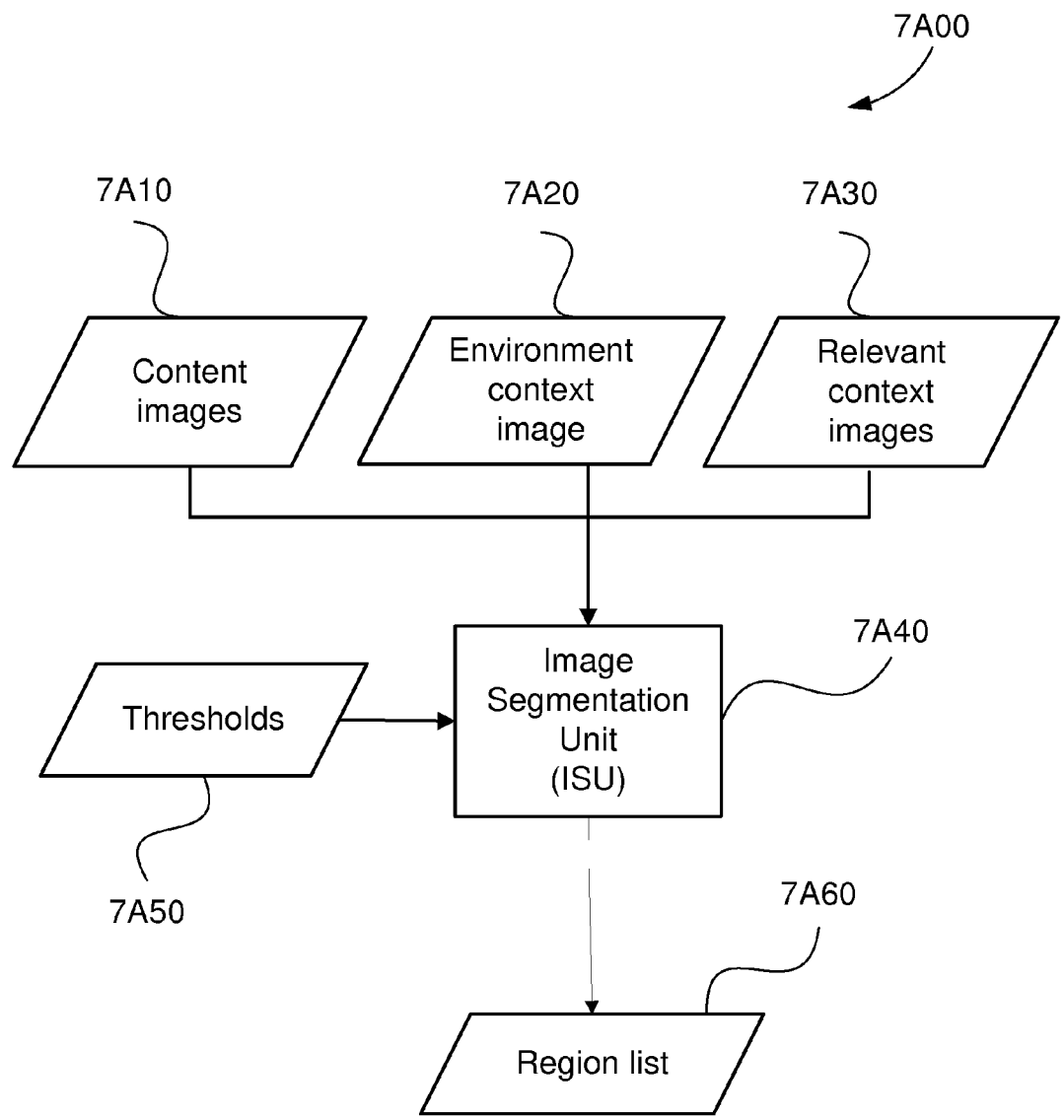
FIG. 7A is a block diagram showing the input and output of an image segmentation unit.

FIG. 7A depicts a block diagram 7A00 showing schematically the input and output components of the image segmentation process performed by an image segmentation unit (ISU) 7A40. It would be appreciated that the used references are only notional and the processing within the ISU 7040 is actually performed by processor 105. In particular, ISU 7A40 receives one image from 7A10, 7A20 or 7A30, a set of thresholds 7A50, and outputs a list of regions 7A60. The ISU subdivides a pixel image into its constituent regions or objects. Most of the segmentation algorithms are based on one of two basic properties of intensity values: either similarity or discontinuity. In the first category of the algorithm, the approach is based on partitioning an image into regions that are similar according to a set of predefined criteria. The approach in the second category is to partition an image based on abrupt changes in intensity such as edges. Both techniques are used in one embodiment of the described method.

Figure 7B:
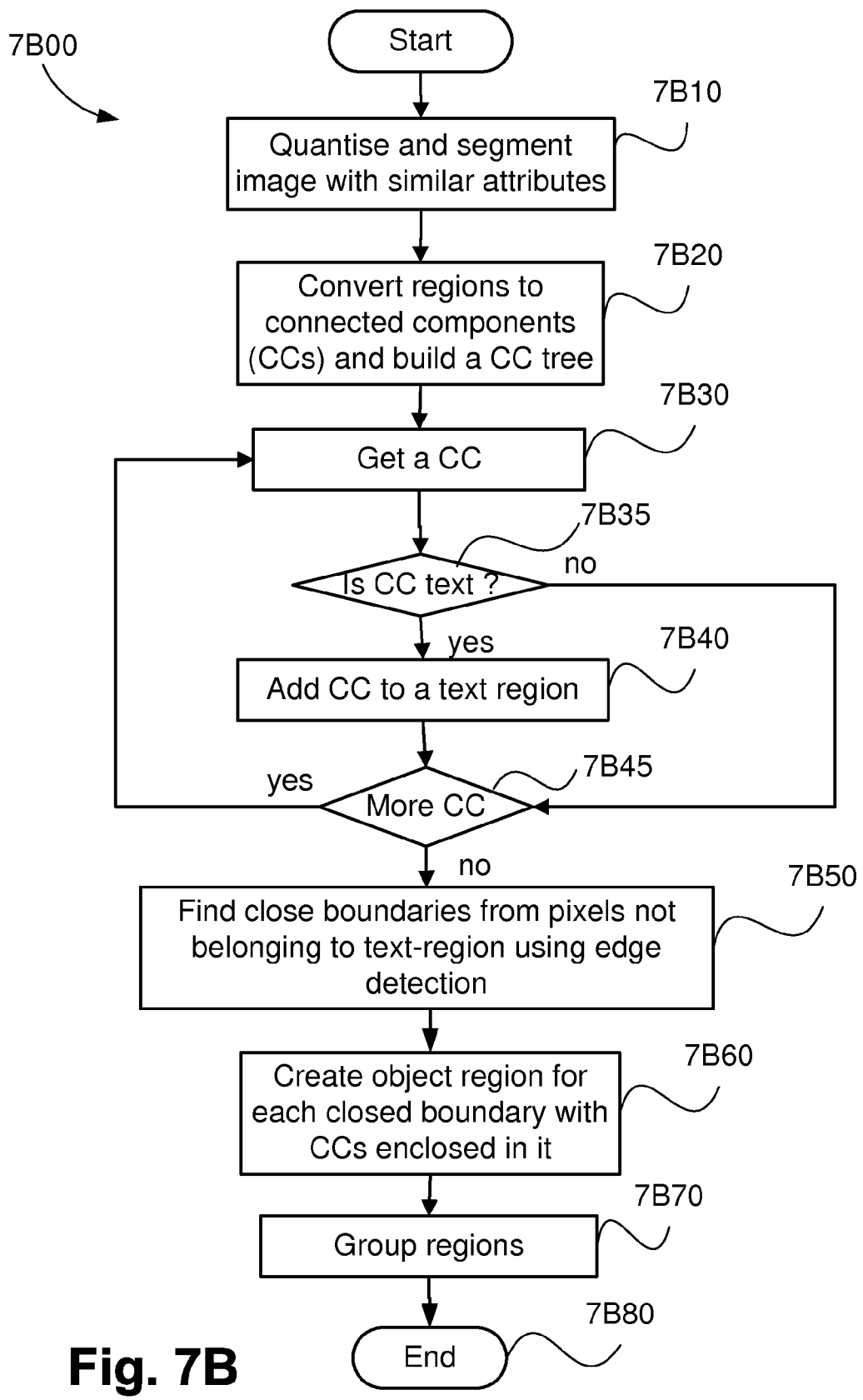
FIG. 7B is a schematic flowchart of an example of a method of image segmentation.

FIG. 7B depicts a flowchart of an image segmentation method 7B00 in one implementation. The method starts with step 7B10 of quantising and segmenting the image into regions with similar attributes. The image is first divided into 32 by 32 pixel tiles. Then each tile is examined to determine a set of quantised colours that best represent the tile. In the preferred embodiment, the maximum number of quantised colours in a single tile is 4. However, any suitable number of quantised colours may be used. The pixels of the image are segmented, using the quantised colours, into a collection of regions. A region consists of neighbouring tiles that have similar attributes. Attributes are described by statistics such as dominant colours, average colours, number of pixels, pixel density and ratio of perimeter to area of the pixels. The set of thresholds 7A50 may contain a colour similarity threshold value ThC to be compared against colour similarity values calculated as follows. In one embodiment, ThC can be 5 pixels. If a pixel is represented by (Rp, Gp, Bp) which are red, green and blue values, and the average colour of the region is (Rm, Gm, Bm) for red, green and blue values, the pixel is considered as having a similar colour to the region under the following conditions:

$$|Rp-Rm|<ThC \text{ AND } |Gp-Gm|<ThC \text{ AND } |Bp-Bm|<ThC$$

Step 7B20 converts the regions obtained from 7B10 into connected components (CCs) which consist of adjacent pixels found within the regions. In the preferred embodiment, a tree graph is generated based on the containment of the connected components. A first CC is contained by a second CC if none of the first CC contributing pixels exist outside of the second CC. For example in FIG. 5, CC 560 is contained in CC 580 and CC 540 is contained in CC 530.

After producing the connected component tree graph, a process of text region detection starts. At step 7B30 a CC is obtained. Next, decision step 7B35 checks whether the CC is a text CC using its statistics with predefined font information. Examples of the statistics used here include: size, density, aspect ratio, straightness and the relationship between the current CC and any nearby CCs. The CC relationship information may be distance between the edges of the CCs, differences in the coordinates between the bounding boxes of the CCs or any other suitable information.

If a CC is a text CC, the process continues to step 7B40 to add the CC to a text region adjacent to the CC. If no text region is nearby, a new text region is created. A text region consists of one or more lines of text. The distance threshold, predefined in 7A50, is between a CC and a text region. If the distance between a text CC and any text region is greater than this distance threshold, e.g., 2 pixels, a new text region is created and the CC is added to the new text region.

After step 7B40, the process continues to step 7B45 to find out if there are more CCs in the CC tree graph. If there is another CC, the process goes back to step 7B30. Otherwise, it continues to step 7B50.

If in decision step 7B35a CC is not a text CC, the process goes directly to step 7B45.

When there are no more CCs to process, the process goes to step 7B50 which finds close boundaries from pixels not belonging to any of the text regions. In one embodiment, an edge detection method using Sobel masks is used to find edges. Following the edge detection process, an edge linking technique is applied to find the region boundary. One approach is regional processing that uses functional approximation to fit a 2-D curve to the known points. Polygonal approximations can be used to capture the essential shape features of a region.

Step 7B60 creates object regions from the boundaries obtained from step 7B50 and references to the regions from 7B10 that are enclosed inside each boundary. In other words, each object region is defined with a boundary and a list of regions. The statistics of the object region contains the statistics of the enclosed regions and statistics of the object, e.g., the ratio of perimeter of the boundary of the object to its area. In FIG. 5, the relevant context image 520 has a background region 525 and an object region 590. The regions extracted from 7B10 for the cello 590 have the statistics about the colours of different regions of the cello, including 530 and 540.

Regions obtained from step 7B10 that are not classified as text regions or included in any object regions are referred to as simple regions. For example, 410 in FIG. 4 is a simple region.

Step 7B70 groups all regions into three types: text regions, object regions and simple regions. The method of image segmentation concludes at step 7B80. The output of the ISU 7A40 is a list of regions 7A60.

Figure 7C:
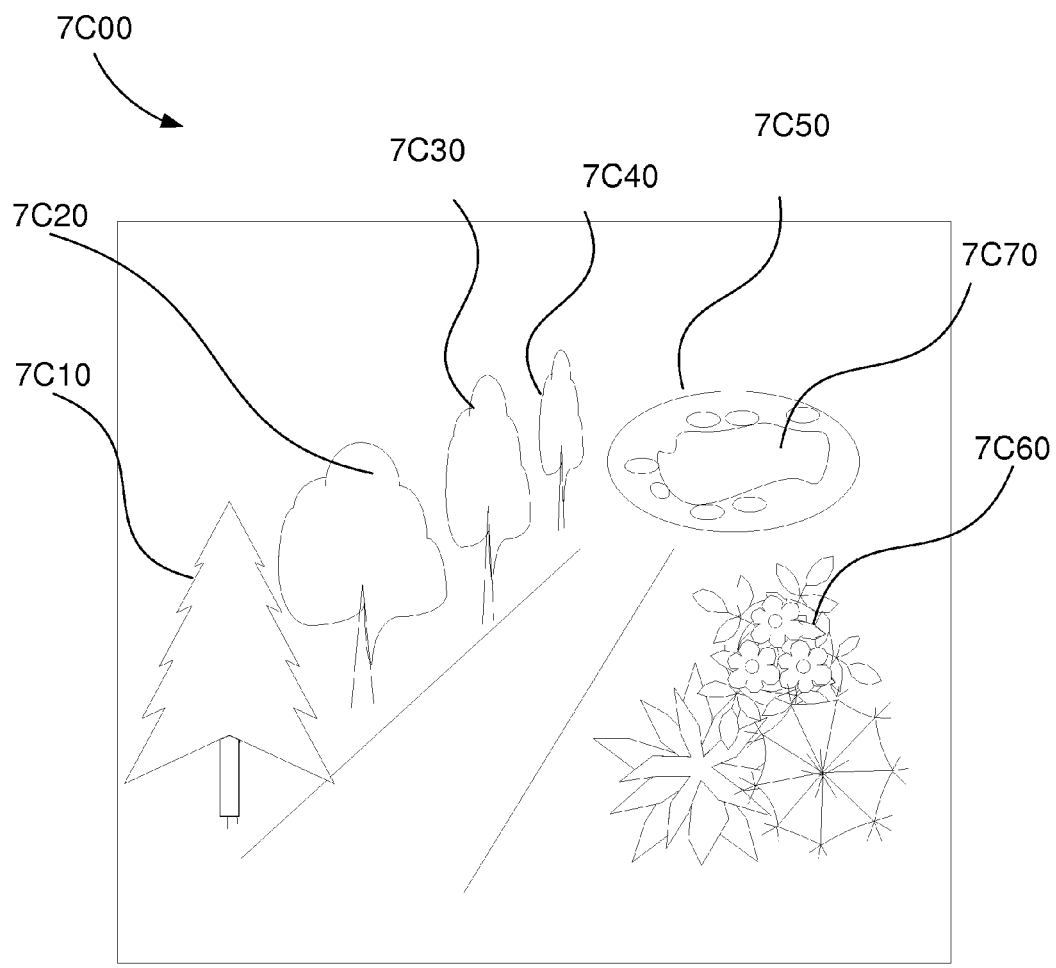
FIG. 7C shows object regions of an image.

FIG. 7C shows labels indicating the object regions of a content image 7C00. Objects 7C10, 7C20, 7C30, 7C40, 7C50, and 7C60 are detected as object regions. 7C70 is one of the regions contained in the object region 7C50.

FIG. 8 illustrates an example of a region list with three region types. The region table has columns for region id 810, region type 820 and statistics 840. A region type can be text, object or simple. However, other region types can also be used by the described method.

Each row contains statistics for the simple region, for the object region or for the text region. In the preferred embodiment, the statistics can be:
  colours (e.g., average colour, dominant colour, colour distributions)
  fonts if it is a text region (including size, font family, weight, etc)
  position
  bounding box
  boundary
  ratio of boundary circumference to its area The font statistics only appear in the text region 847, while others apply to regions of all types, 845, 846 and 847.

There are region statistics in rows 850, 860 and 870 for three different types of regions: simple region, object region and text region. For example, average colour (yellow) is defined in 845 as a statistical characteristics of the simple region 850, boundary of the object is defined in 846 as a statistical characteristics of the object region 860 and font size and background colour (blue) are defined in 847 as a statistical characteristics of the text region 850.

Figure 9:
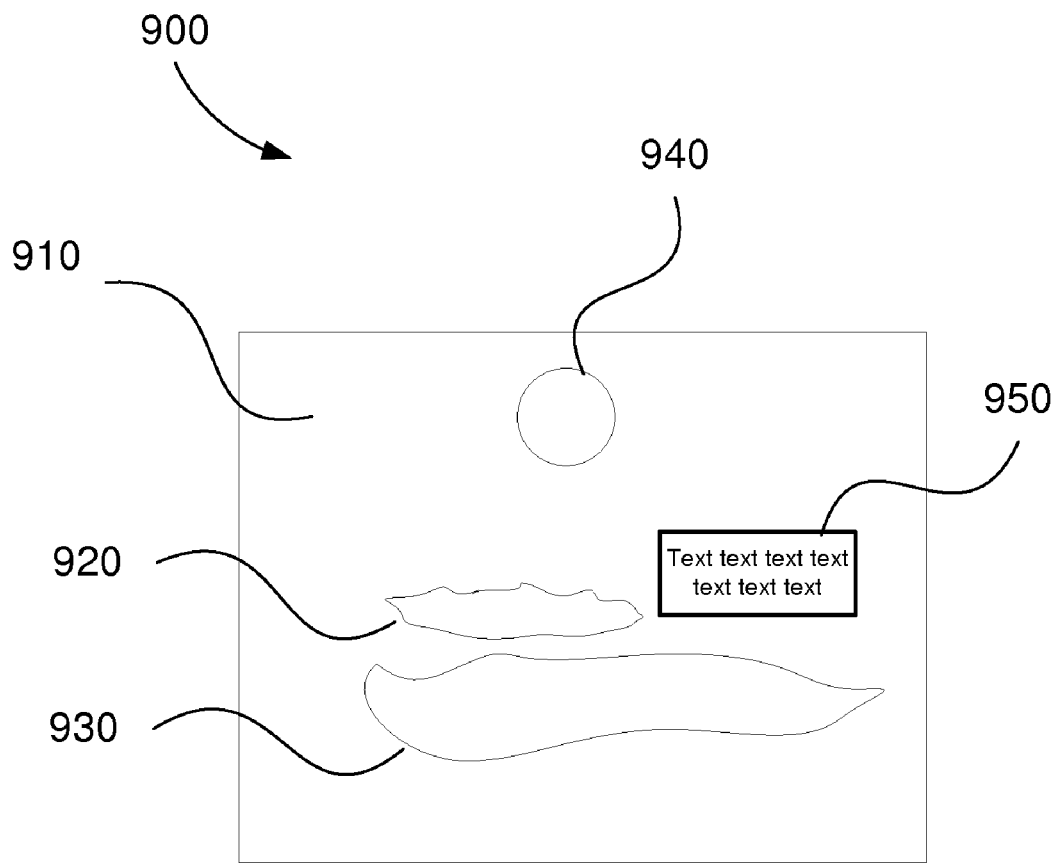
FIG. 9 is an example of segmented regions of an image.

FIG. 9 shows an example of a segmented image. The background of the image 900 is a simple region labelled as 910. There are three object regions; 920, 930, 940 and one text region 950. Depending on the threshold for the image segmentation, the regions can vary a great deal. For example, if the colour similarity threshold in 7A50 increases, a larger region may be detected, e.g., regions 920 and 930 could be merged into one region, since more colours will be considered as similar. However, the text region 950 and the non-text region 920 cannot be merged because their region types are different.

Creating Layout Styles

Figure 10:
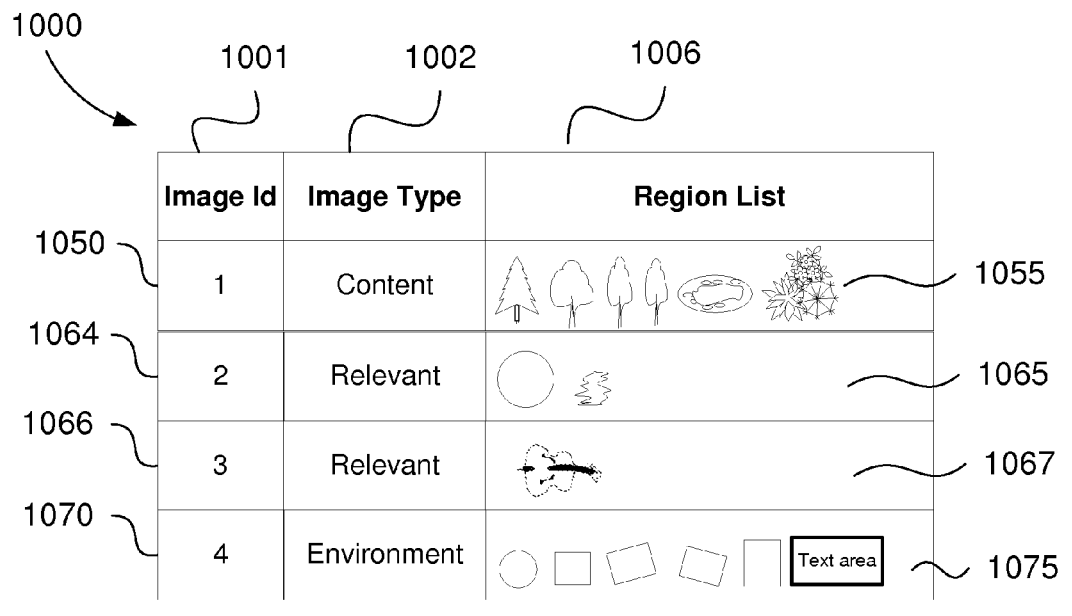

The statistics of the regions form the styles of the image. As the extracted styles from different image types serve different purposes for the image layout creation process, they must be organised separately. FIG. 10 is an example of the image region table 1000 for images 400, 510, 520 and 7C00. The table consists of columns: image id column 1001, image type column 1002 and region list column 1006. In this example, there is one row 1050 for content image 7C00, two rows 1064 and 1066 for relevant context images 510 and 520 respectively, and one row 1070 for environment image 400. Only text regions and object regions are shown in the region list 1006 in FIG. 10. For each of the content image, two relevant images, and the environment image, associated object regions 1055, 1065, 1067 and 1075 respectively are listed.

The statistics of the extracted regions from all three kinds of images are used to create styles to lay out the content of the newly designed composite image. The styles applied to the content for the page layout are called layout styles.

There are different layout styles that can be applied to different content elements to determine visual properties relevant to the respective layout element. For example, for laying out a text element, layout styles include font colour, size, family, weight, etc. When the text is laid out on the page, it is formatted inside a boundary. This boundary area and its location are also considered as a layout style for the text. For an image, its styles include location, dimension and border. However, there is no limit on what can constitute layout styles in the present method.

Figure 6:
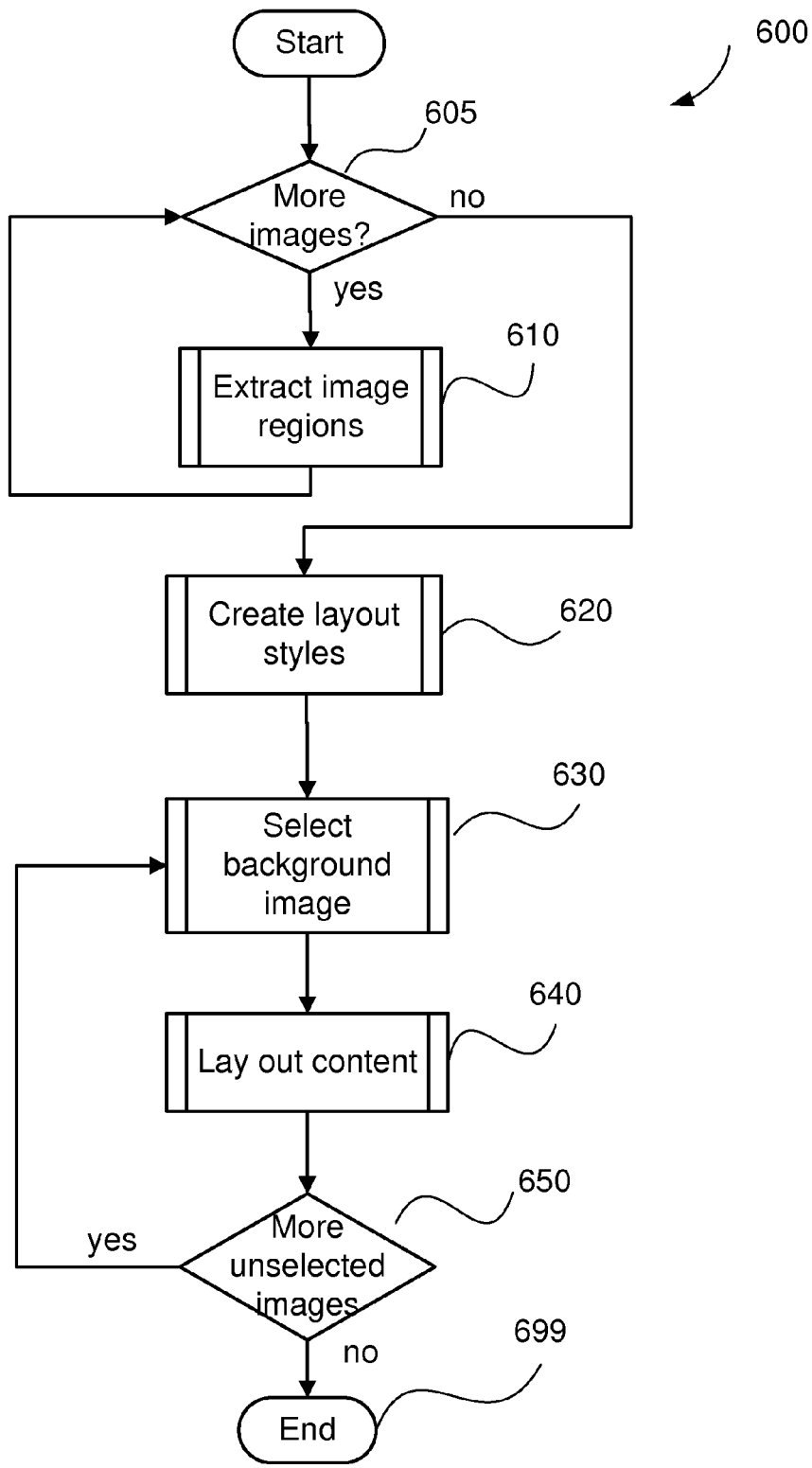
FIG. 6 is a schematic flowchart showing details of step 250 of the method illustrated in FIG. 2.

Step 620 in FIG. 6 is now described in more detail.

Figure 12:
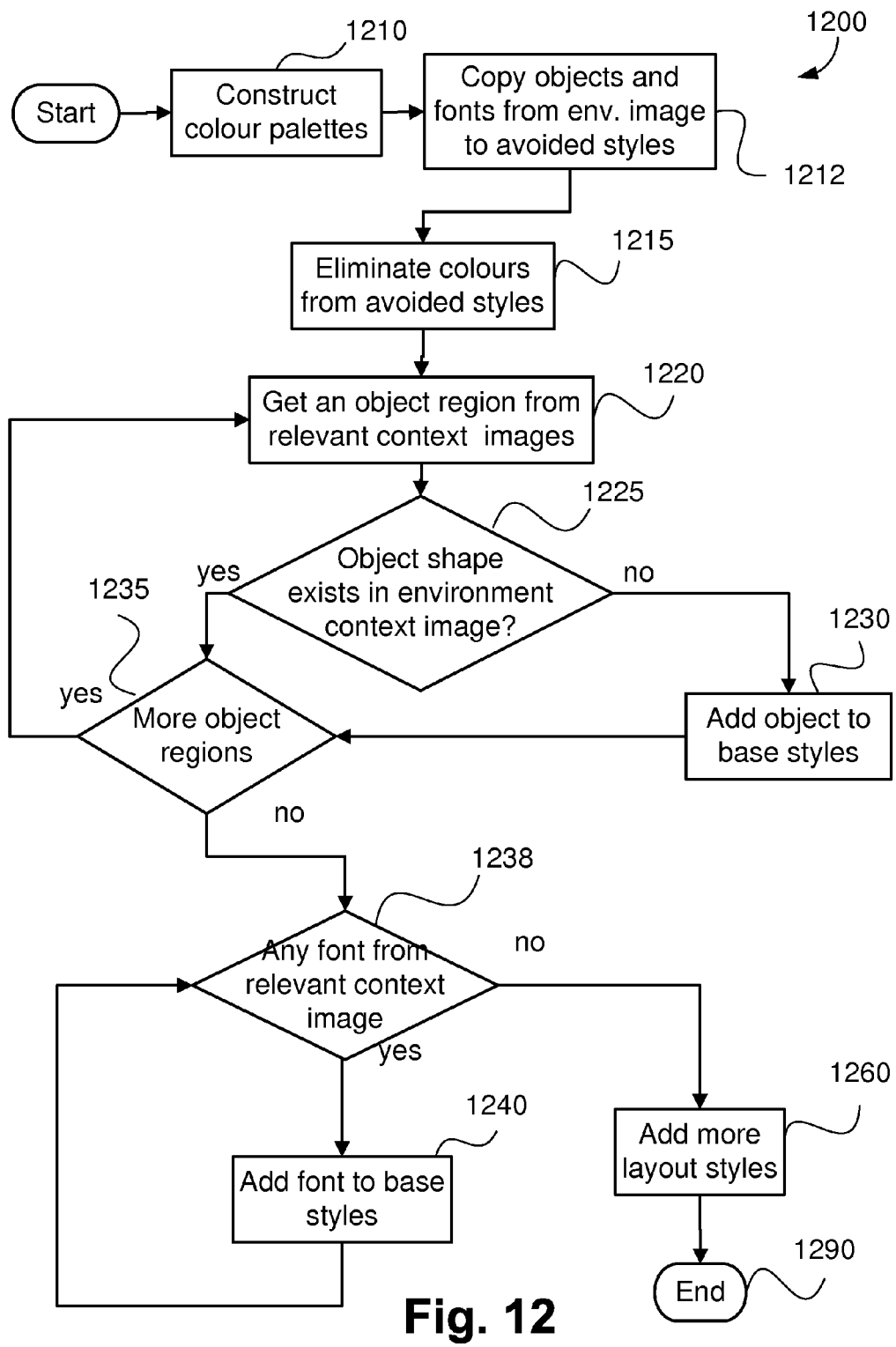
FIG. 12 is a flowchart illustrating the method of creating layout styles.

FIG. 12 illustrates a flowchart 1200 of the step 245 of generating the layout styles. This method creates three types of layout styles:

base styles: can be used directly for a content element and are initially extracted from the relevant context images;

auxiliary styles: should be considered if no appropriate base style can be applied to a content element, and are initially extracted from the content images;

avoided styles: cannot be used for any content element and are extracted from the environment image.

Figure 11:
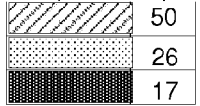
FIG. 11 is an example of layout styles.

An example of layout styles created from images 400, 510, 520 and 7C00 is shown in FIG. 11. There are columns 1110, 1120, 1130 and 1140 for style type, colour palette, shapes and font, respectively. Three style types: base styles 1150, auxiliary styles 1160 and avoided styles 1170, are included in 1100. The colour palette 1120 has a list of colour 1188 described in RGB and a percentage of usage 1190 in the original image. The colours are ordered by decreasing percentage used. The shape list 1130 contains selected object regions from region list 1006. Shape 1158 is an example of a shape belonging to one of the base styles 1150. Shape 1180 is a rotated copy of shape 1158 and is for auxiliary styles 1160. The shapes listed in 1175 are for avoided styles 1170. The shapes described by region boundaries are arranged in the order of area. However, they could also be ordered by likelihood of usage. The shapes are mainly used as text formatting boundaries. In FIG. 11, the statistics of each style (colour, shape or font) can be obtained from the statistics column 840 in the region list in FIG. 8. The layout styles 1100 are constructed during the step 620 of creating layout styles.

The method 1200 of creating layout styles for the composite image is illustrated in FIG. 12. The method begins with step 1210 in which the processor 105 constructs three colour palettes for base styles 1150, auxiliary styles 1160 and avoided styles 1170. Colours in the base styles 1150 are from relevant context images, colours for the auxiliary styles are from content images, while colours for the avoided styles are from the external environment context image. For each type of image, the dominant colours are extracted from the statistics 840 of the region list 800. A limited number (e.g. 5) of dominant colours are added to the corresponding colour palette. In FIG. 11, there are only three colours in the base styles 1150, five colours for auxiliary styles 1160, and four colours for avoided styles 1170. The colours in the palettes are in the order of most dominant colour first. The dominant colour is represented by a percentage of colour use in the original image. Each colour 1188 in the colour palettes is associated with a percentage 1190 of that dominant colour to the original image.

Next, in step 1212 the processor 105 copies shapes of all objects and all fonts from the external environment context image to avoided styles 1170. As the extracted styles from the external environment context image are external to the page layout design, they are used differently from the extracted styles from the content and relevant context images. To make the page layout stand out from the environment context, the page layout should avoid using any colours, fonts, or shapes of objects from the external environment context image.

Next, in step 1215 the processor 105 modifies colours in the base styles and auxiliary styles by removing any colour which is close to a colour in the avoided styles 1170 or duplicated between base styles and auxiliary styles. For example, after step 1210, there are colours (c1, c2, c3) in the base styles 1150, colours (c2, c4, c5) in the auxiliary styles 1160, and colours (c1, c6, c7, c8) in the avoided styles 1170. Step 1215 will remove c1 from the base styles because c1 also appears in the avoided styles. Also c2 in the auxiliary styles is eliminated because c2 is already in the base styles. Now, the three colour palettes are; (c2, c3) for base styles, (c4, c5) for auxiliary styles and (c1, c6, c7, c8) for avoided styles.

In step 1220 the processor 105 selects an object region from the region list 1065 or 1067 in the corresponding relevant context image 1064 or 1066. If there are more than one relevant context images, after all objects have been selected from one relevant context image, an object from another relevant context image is considered.

In decision step 1225, the processor 105 compares the shape of the selected object with object shapes in the environment image, described in the region list 1075. If the shape of the selected object is similar to the shape of any object from the environment image, the method, as executed by the processor 105, goes to step 1235. Otherwise, step 1230 adds the shape of the selected object to the shape list of the base style 1150. Then the method proceeds to step 1235.

In step 1235 the processor 105 checks whether there are any more objects in the relevant context images. If there are, the processor 105 returns the method back to step 1220. Otherwise, the method continues to step 1238.

Step 1238 checks whether there is any font found in any of the relevant context image. If so, the font is added to the base styles 1150 in step 1240. Then, the method goes back to step 1238 to check for another font. If there are no more fonts to select, the method continues to step 1260.

At step 1260, the processor 105 can added to the colour palette in the auxiliary styles 1160 a limited number of colours suggested from a colour adviser or user-defined rules (e.g., complementary colours to the colours obtained from the external environment context image). Shapes that may not be appropriate as a text boundary may be deleted or transformed. For example, a narrow shape (e.g., region's width is smaller than the width of the longest word in a text content) is not suitable for horizontally formatted text or text with long words. However, if the shape is rotated 90 degrees, it can be considered. For example, in FIG. 11 a rotated cello object 1180 is added to the auxiliary styles.

If there are too many layout styles created in previous steps, further selection rules can be created to determine which styles are most appropriate for the page layout. For example, in the external environment context image, colours appearing within 20 cm of the page layout position, listed in the colour palette of the avoided styles 1170, should not be selected. Another rule can be choosing a colour from the colour palette that has the most contrast to the background colour.

The method 1200 terminates at step 1290.

Selecting Background Image

In the disclosed method, a background image may be considered for the page layout. Any content and relevant context image is a candidate. However, only an image that has enough empty regions to lay out the content is suitable for a background image. The regions extracted from step 610 can be used to aid in this selection process.

Figure 13:
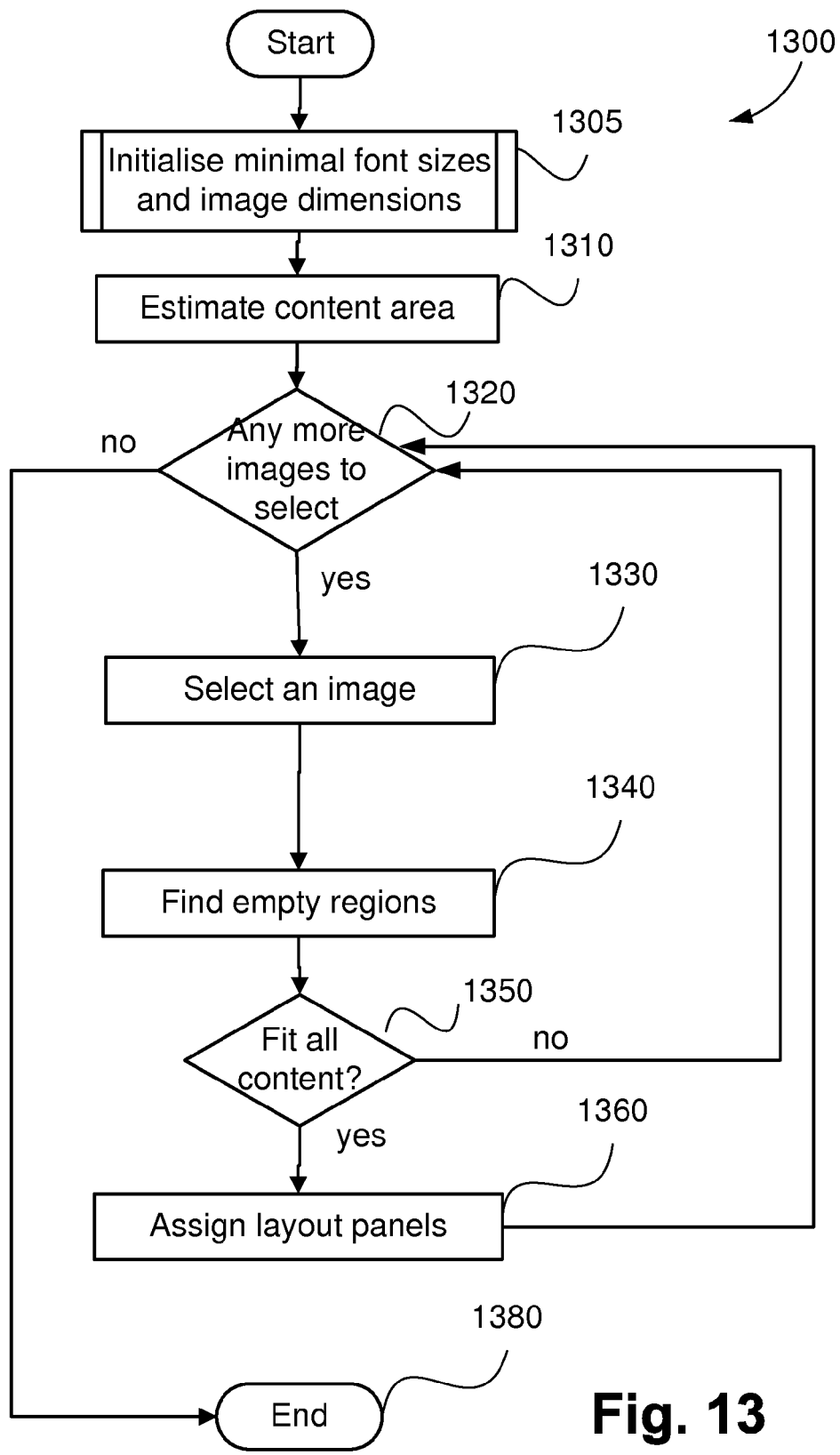
FIG. 13 is a schematic flowchart illustrating a method of selecting a background image.

Now, step 630 of selecting a background image is described in detail. FIG. 13 is a flowchart for the method 1300 of selecting a background image. First, step 1305 initialises minimal font sizes, image widths and heights for four levels of emphasis of the content elements. This step is explained further with regard to FIG. 14B.

Once the font sizes are initialised, the estimate of total content area is performed in step 1310. As each text content element has an emphasis, it is assigned an appropriate font size according to its emphasis. An initial total text area can be calculated using these initial font sizes and text lengths. Each content image also has a minimum dimension. The total area of the image content and text content can be calculated.

All content images must be present in the page layout, but their dimensions may vary depending on their levels of emphasis. An image content element can be selected as a background that will overlap with other content elements, or be laid out as an individual content element. However, the relevant context images can be included in the page layout only as a background or just used to extract styles.

In the selection process of a background image, each image from the content and relevant context images is examined. An image that has been checked will be marked. In step 1320, the processor 105 checks and if there is any unmarked image, the method continues with step 1330. Otherwise, the method concludes at 1380, with no suitable background image selected. Note that the external environment context image is not considered in this process.

Step 1330 selects the first unmarked image and scales it to the approximate dimension of the page layout keeping the original aspect ratio. This scale factor is then used for all regions inside this image.

Step 1340 then finds empty regions (scaled) in the selected image, which are suitable for the content. An empty region is a non text region that has flat colours or is characterised by low contrast among the colours inside the region. Other criteria can be created as a selection rule for selecting an empty region. For instance, if a region has a long narrow shape which may not be suitable for text formatting, then this region may be excluded from consideration for an empty region.

In the decision step 1350, the processor 105 checks whether there are enough regions for the content area calculated in step 1310. If the selected background image is a content image, the area for this image must be excluded from the content area. In step 1350, the following condition must be met for the content to fit into the empty region:

$$T_{ER} > T_{CA} \quad (1)$$

$$\text{Min}(RA_i) \geq \text{Min}(CA_j) \quad (2)$$

$$\text{Max}(RA_i) \geq \text{Max}(CA_j) \quad (3)$$

where $$T_{ER} = \text{total empty region} = \sum_{i=0}^{n} RA_i,$$

$$T_{CA} = \text{total content area} = \sum_{j=0}^{m} CA_j,$$

$RA_i$ = Area for empty region $I$, $CA_j$ = Area for content element $j$, $n$ = total number of empty regions, and m=total number of content elements excluding selected content image as the background.

If there are enough empty regions to fit all content, the selected image is a candidate for the background of the page layout and the method 1300 continues to step 1360. Otherwise, the method returns back to step 1320. Step 1360 assigns each of the empty regions as a layout panel and marks the selected image as 'used'.

Each layout panel has a bounding box. A big panel should be divided into smaller panels according to predefined partition rules. For example, one rule is: if the ratio of panel width and the maximum font size selected for the content is greater than 80, than the panel is split into two panels with equal width. The order of the layout panels is assigned according to certain rules. For example, one predefined order is from left to right and then from top to bottom based on the top left corner of the bounding box of the layout panel.

Figure 14A:
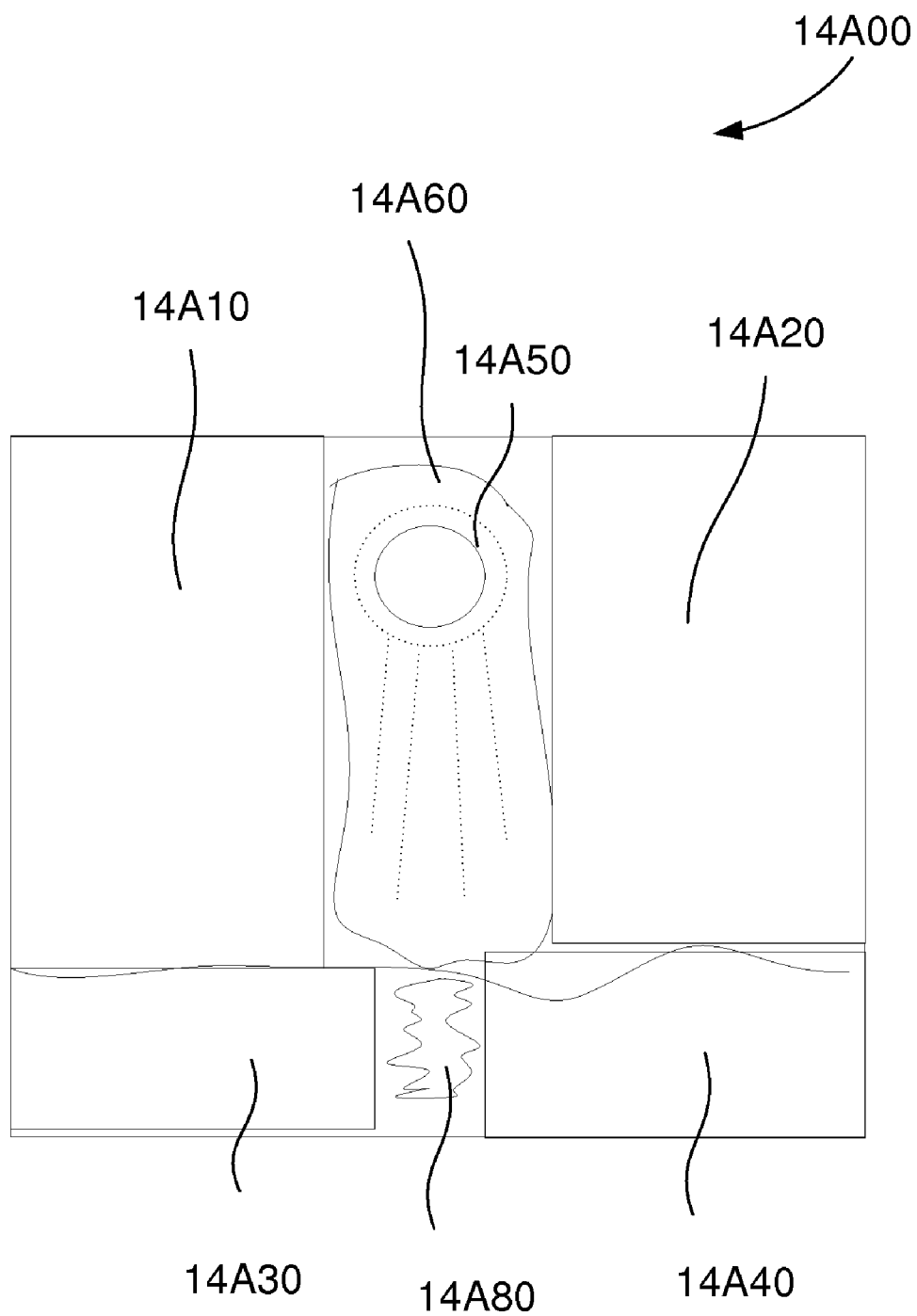
FIG. 14A is an example of layout panels.

FIG. 14A shows the layout panels 14A00 obtained from the relevant context image 510. The order of the layout panels is 14A10, 14A20, 14A30 and 14A40. Other regions 14A50, 14A60 and 14A80 are not selected as layout panels because 14A50 and 14A80 are not big enough to fit the minimum content element in 300 and 14A60 has no flat colour.

At the conclusion step 1380 of the method 1300, either an image has been selected or no image has been found to be appropriate for use as the background. All images selected in step 1330 must be marked so that the same image will not be examined again.

If there is more than one image that can be used as a background, the disclosed method, executed by the processor 105, will create more than one page layout. If no background image has been be selected, there will be only one layout panel for the page layout and a default layout flow is set, e.g., a grid based layout flow. Alternatively, one of the thresholds 7A50 may be changed to merge small regions in the content images and relevant context images, after which the background selection method 1300 is started again.

Figure 14B:
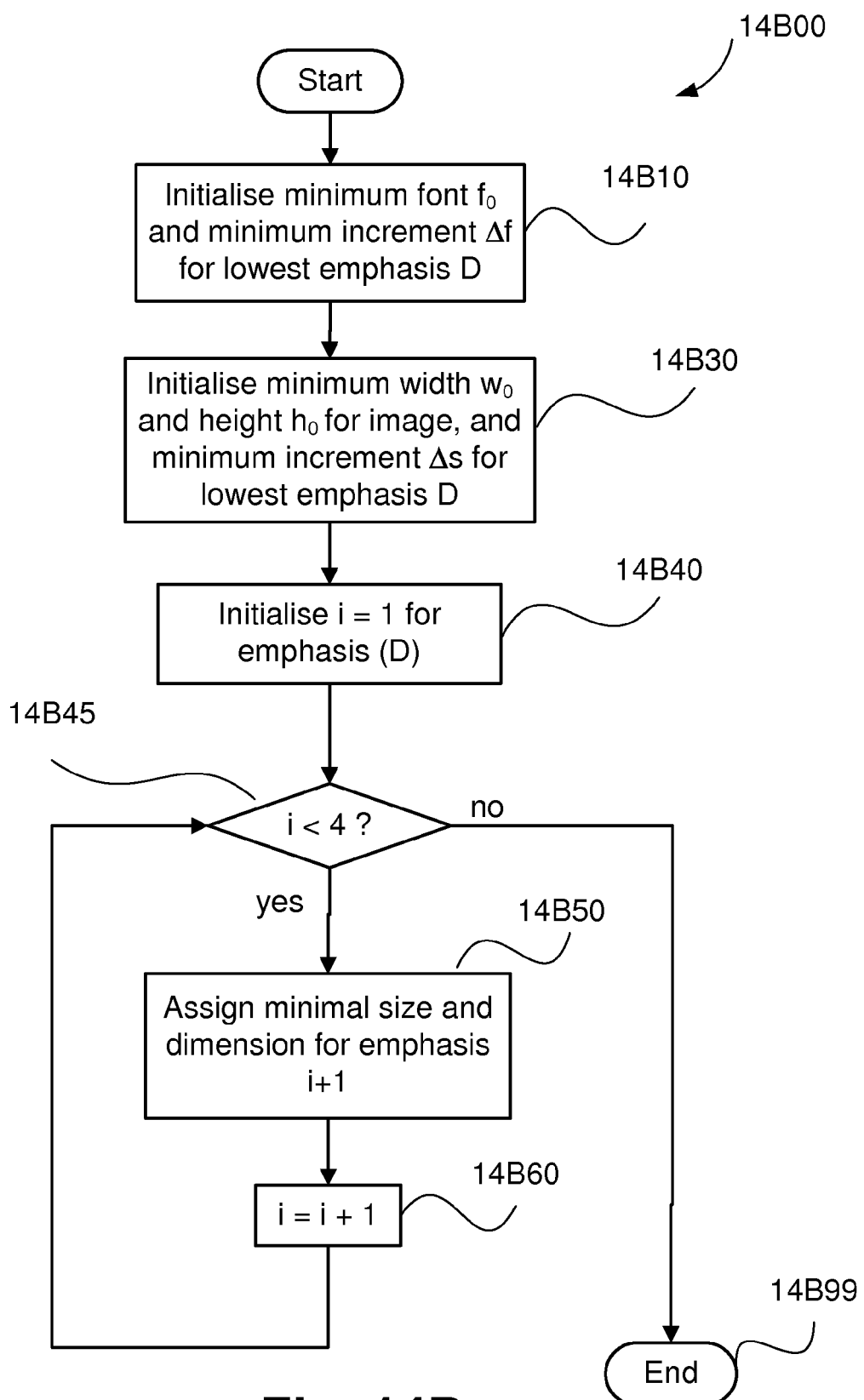
FIG. 14B is a schematic flowchart for initialising minimal font sizes and minimum image dimensions.

Now the step 1305 of the method 1300 is further described with reference to FIG. 14B. This step calculates minimal font sizes of text content elements for every level of emphasis, and minimum dimensions (width and height) of image content elements for every emphasis level. As each text content element or image content element can be associated with an emphasis and there are four levels of emphasis in the present implementation, minimal font sizes for the text content in each emphasis need to be initialised. Similarly, minimal widths and heights for the image content in different emphases must be initialised.

The method 14B00 starts with step 14B10. The step assigns a minimal font size $f_0$ for the lowest emphasis D and a minimal increment of font size $\Delta f$. These two initial values $f_0$ and $\Delta f$ depend on the size of the page layout. For example, if the page is A4 or A3 size, $f_0$ is set to 6 pts and $\Delta f$ is set to 2 pts.

The following step 14B30 initialises the minimal width $w_0$ and height $h_0$ of an image for the lowest emphasis D and a minimal increment $\Delta s$. Given an image of dimension 600× 800 pixels, the image needs to be scaled to a point that new width w and height h satisfy the following conditions:

$$w=w_0 \text{ AND } h<h_0 \text{ OR } w<w_0 \text{ AND } h=h_0$$

The minimal width and height also depend on the page size. For example, if the page is A4 or A3 size, both $w_0$ and $h_0$ are assigned to 30 pixels. The minimal increment $\Delta s$ is used to calculate how much to increase the width and height for the next emphasis level. For the example above, $\Delta s$ is equal to 10 pixels.

Now step 14B40 initialises a variable i to 1 for emphasis D to calculate minimal sizes for emphasis C which is one level higher than the lowest emphasis D.

Decision step 14B45 then checks whether variable i is smaller than 4, which corresponds to the highest level of emphasis A. If i is less than 4, the method continues to step 14B50. Otherwise, the method concludes at step 14B99.

Step 14B50 assigns the minimal font size, width and height for the next emphasis level as follows:

$$f_{i+1}=f_0+i\times\Delta f$$

$$w_{i+1}=w_0+i\times\Delta s$$

$$h_{i+1}=h_0+i\times\Delta s$$

Step 14B60 then increments variable i by one and returns back to step 14B45 for the next level of emphasis. Once the highest level of emphasis is reached, the method 14B00 terminates in step 14B99.

Using the assigned text font sizes and image dimensions, the initial content area can be estimated at step 1310.

Laying Out Content

Figure 15A:
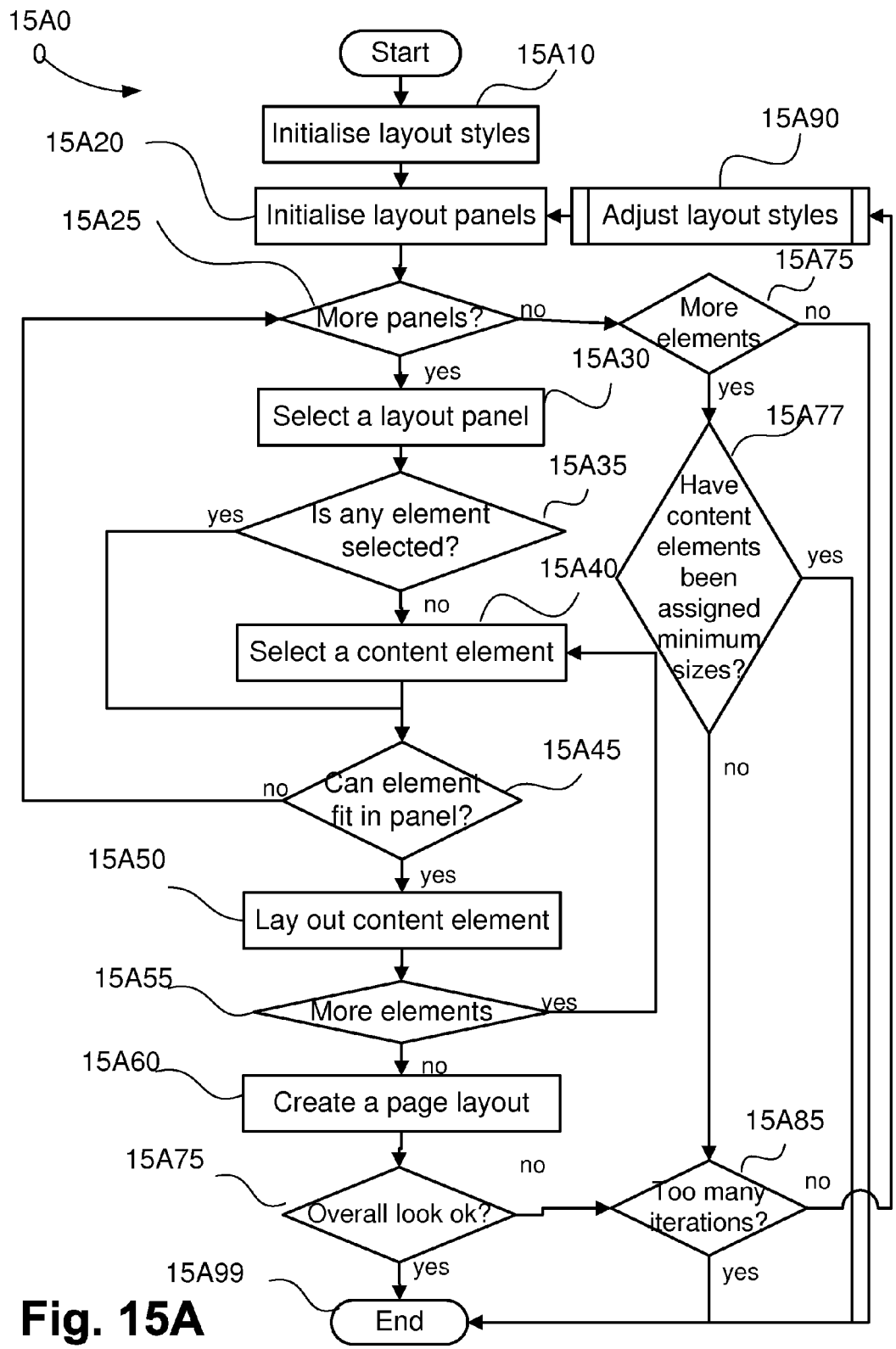
FIG. 15A is a schematic flowchart illustrating a method of laying out content.

Now, step 640 of laying out the content of the composite image is described in detail. FIG. 15A shows the method 15A00 of laying out content with the layout styles 1100 created in step 620. In one embodiment, the method 15A00 makes even distribution of the content across the available layout panels created in step 630.

The method starts at step 15A10 by the processor 105 initialising layout styles for the content. Although the minimum font sizes of the text content and the minimum dimensions of the image content are initialised at step 1305, they may not be appropriate for the available layout panels. For instance, they may be too small for the spaces in the available layout panels. Thus, in this step, font sizes of text content elements and image dimensions are re-estimated. For example, all initial sizes are multiplied by the ratio of available layout panel space to initial content area $T_{ER}/T_{CA}$ (see (1)). Besides the font sizes, all text content elements are assigned font colours, font family etc., in order to create graphic objects that can be laid out on the page layout. Initially, a content image which is already a graphic object has no other layout styles, e.g., border, except its dimensions are adjusted using the ratio $T_{ER}/T_{CA}$.

Next, in step 15A20, the processor 105 initialises the layout panels. Each layout panel is associated with region statistics 840 described in FIG. 8. All layout panels are marked as available and no content element is laid out on them.

In the decision step 15A25, the processor 105 checks whether there are more panels to select for laying out content. If there is a layout panel available, the method continues to step 15A30. Otherwise, it goes to step 15A75.

In step 15A30, the processor 105 selects an available layout panel from the ordered layout panels determined from step 1360. Once a layout panel is selected, a decision step 15A35, executed by the processor 105, examines whether any content element is selected for layout but has not been laid out yet. If no content element is selected, step 15A40 is executed by the processor 105 to select a content element to be laid out based on the content order in 300. The content image used for background is not considered. The method then continues to step 15A45. If in step 15A35 the processor 105 finds that there is a selected element that has not yet been laid out, the method goes directly to step 15A45.

Step 15A45 is then executed by the processor 105 to check whether the selected layout panel has enough space to fit the selected content element. If it has, the method continues to step 15A50. Otherwise, the method returns back to step 15A25 to select another available layout panel. All used layout panels must be marked as 'used' so that they will not be selected again.

At step 15A50, before laying out a text content element, the font colour is checked with the layout panel's background. If the font colour is too close to the background colours extracted from the layout panel's region list 840, the font colour is reselected from the layout styles 1100. The new selected colour must have enough contrast with the background colour(s) and must not be among the colours defined in the avoided styles. A colour adviser can be used to calculate the font colour based on background colours.

When the text content element has the highest emphasis and the area on which the text is to be laid out is smaller than any of the content images (provided that the content image is not a background), a shape contour from the layout styles 1130 is considered to be applied for the text formatting boundary to increase the visual emphasis of the text. The shape needs to be scaled to fit the selected text content element and the text is formatted within the boundary of the shape. Then the shape with the text is placed in the layout panel according to the layout flow.

More layout rules can be added to this layout method to change the styles applied to the content element. For instance, a border can be applied to a content image to raise the emphasis. The border width and border colour can be calculated by the processor 105 based on the background colour around the image and the colours from neighbouring laid-out content.

New statistics for the layout panels must be calculated based on the laid-out content. For example, for a layout panel with text content, the font colour and size, as well as the number of characters, contribute to the colour distribution of the layout panel.

After laying out the selected content element in step 15A50, the content element must be marked as 'used' and the method 15A0 is executed by the processor 105 to continue to the decision step 15A55 that checks whether there are any more elements to be laid out. If so, the method is executed to return back to step 15A40 for selecting another content element. Otherwise, a page layout with laid-out content is created at step 15A60 and then the method continues to step 15A75.

Decision step 15A75 includes automatic inspection of the overall look of the page layout. Similarly to most of the steps in the disclosed method, the processing associated with this automated inspection is conducted by processor 105 or by other processing means located on WAN 120 or LAN 122.

The inspection may, for example, include examination of all layout panels with laid-out content, the available space not yet used in the current layout panel and the unused panels. If there is too much space left, the method is executed by the processor 105 to continue to step 15A85.

In step 15A75, other aesthetic criteria affecting the overall look can be also checked. For instance, the emphases of the content elements may also be examined. If the original emphases of the content elements are not kept, the method may also proceed to next step 15A85.

Other methods of checking the overall look can also be applied. For example, whether the overall look of a page layout is good or bad can also be judged by verifying the compliance of the generated page layout with a series of predetermined aesthetic criteria including balance, content distribution, symmetry, emphasis, etc, usually defined from design principles for graphic design. An aesthetic criteria of the page layout can be calculated based on region statistics. As the region's statistics contain local information about regions, the overall statistics can be also built from the local statistics. If the overall check on the layout does not reach a desired limit, e.g., not balanced or symmetrical, the method can be executed to proceed, via step 15A85, to a step 15A90 of adjusting the layout styles.

Step 15A85 checks whether there are too many iterations for adjustment of layout styles. If it is within a limited number of iteration (e.g., 10), the method is executed by the processor 105 to continue to step 15A90 to adjust the layout styles and restart the content layout method again. If, at step 15A75 the generated page layout is found satisfactory the method terminates at 15A99.

When there are no more layout panels found at step 15A25, the method is executed by the processor 105 to go to decision step 15A75 to verify whether there are any more content elements to be laid out. If there are further elements to be laid out, the method continues to step 15A77, where verification is performed for whether the elements have been assigned with minimum font sizes and image dimensions. If so, the method terminates with an incomplete page layout which means not all content can be fitted into the available layout panels. However, if the content has greater sizes than the minimum, the sizes can be decreased, thus the method proceeding to step 15A85.

The adjustment in step 15A90 includes adjusting the content sizes and emphases. In one example, the emphasis of a text content element may be associated with implementing the aesthetic criteria with the following styles:

1. $PT_1$: Text area ratio to total content area;
2. $PT_2$: Contrast ratio (calculated from the font colour and background colour, 0 if no contrast, 1 for maximum contrast);
3. $PT_3$: Text formatting boundary border factor (0 if there no border, 1 if border width has the maximum pixels (e.g., 10 pixels);
4. $PT_4$: Text formatting boundary border contrast ratio (calculated from boundary colour and background colour, value ranges from 0 to 1);
5. $PT_5$: Text formatting boundary shape factor (e.g., 0 if is rectangle, 0.5 if is circle, or 1 if shape is selected from the layout styles. Other methods of calculating the shape factor can be based on text area, perimeter, bounding box, etc).

If a style is described as $PT_i$, the emphasis of a text element, Et, is described below:

$$Et = \sum_{i=0}^{M} \frac{(PTi \times WTi)}{M} \quad (4)$$

$$M = \sum_{i=9}^{M} WTi \quad (5)$$

where
$WT_i$ is a predefined weight assigned with a value from 0 to 1; and
M is the number of different styles listed above (e.g., 5) and is the total of all weights, $WT_i$.

In one example, the layout styles for image content element consist of the styles in the image itself and the border. The emphasis of image, Ei, can be calculated from the following styles:

1. $PI_1$: Ratio of image area to total content area;
2. $PI_2$: Contrast of dominant colour in the image and the background colour of the layout panel;
3. $PI_3$: Image border (0 if there no border, 1 if border has maximum width, e.g., 10 pixels);
4. $PI_4$: Image border contrast (calculated from border colour and background colour of the panel);

If each of the above styles is described as $PI_j$, the emphasis of an image content element, Ei, is defined as below:

$$Ei = \sum_{j=0}^{N} \frac{(PIj \times WIj)}{M} \quad (6)$$

$$N = \sum_{j=0}^{N} WTj \quad (7)$$

Similar to (4), $PI_j$ is from the list above and $WI_j$ is the weight corresponding to $PI_j$. N is the number of different styles. In this case, N is 4. The summation of $WI_j$ must equal N.

Each emphasis of a content element has a minimum value and a maximum value. The maximum value of the content element with the highest emphasis A is considered as the maximum emphasis value of the page layout and is denoted as $E_{max}$. The minimum value of the content element with lowest emphasis D is considered as the minimum emphasis value of the page layout and is denoted as $E_{min}$. The interval I between $E_{min}$ and $E_{max}$ ($E_{max}-E_{min}$) is used to calculate the value of the emphasis in each level. In one embodiment, emphases are defined as follows:

Emphasis A: $I < Et \leq 0.8 \times I$
Emphasis B: $0.8 \times I < Et \leq 0.6 \times I$
Emphasis C: $0.6 \times I < Et \leq 0.4 \times I$
Emphasis D: $0.4 \times I < Et \leq 0.1 \times I$ (emphasis below $0.1 \times I$ is not acceptable)

Further, the position of the content element on the page can also affect the emphasis. For example, an element position in the top left quadrant of the page has the emphasis calculated from formula (4) multiplied by a factor of 1.1, but an element in the bottom right quadrant has the calculated emphasis multiplied by 0.9. This implies that even an element with less emphasis calculated from formula (4) ends up having more emphasis because by default the top-left quadrant attracts more attention. If a content image is selected as the background image, its emphasis can be changed or ignored altogether.

At step 15A90, if the expected emphases of the content elements are not achieved after the layout process, any of the styles $PT_i$ associated with the content element can be updated to change the emphasis. For example, increasing the contrast will increase the emphasis.

Figure 16A:
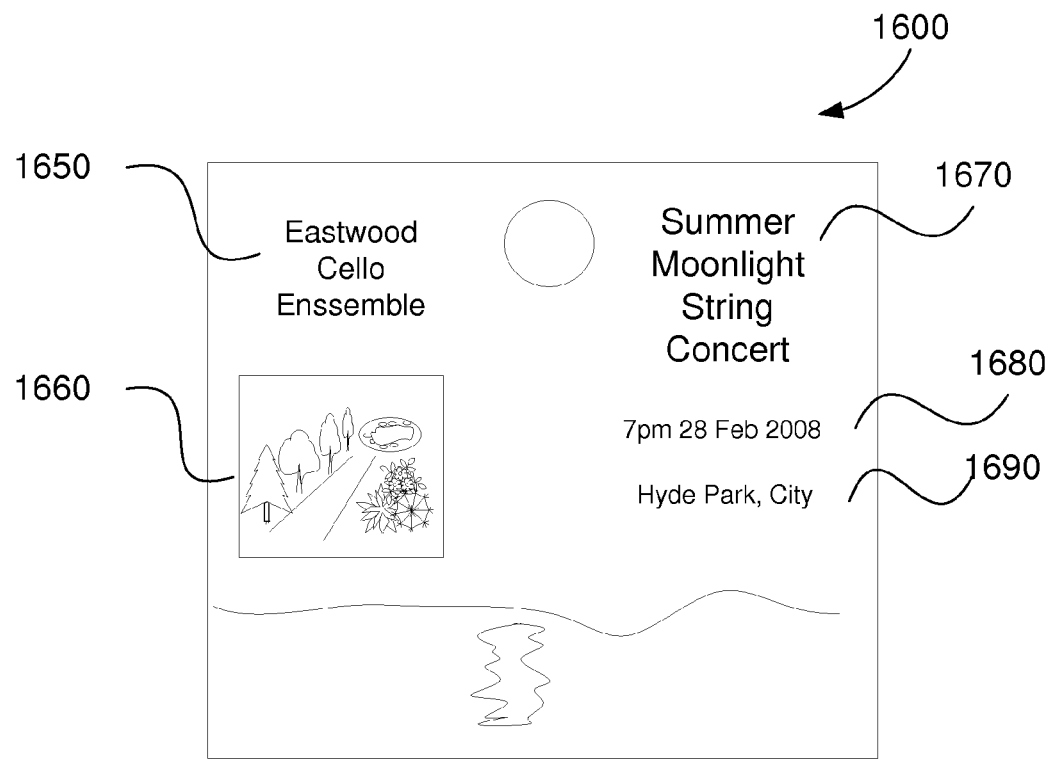
FIG. 16A and FIG. 16B show two page layouts.
Figure 16B:
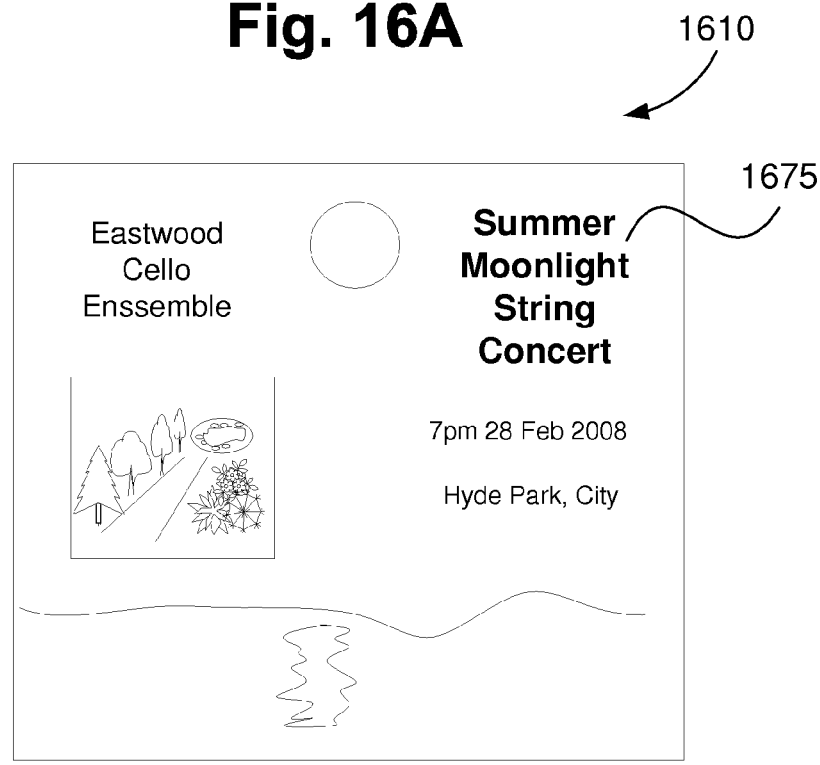

Two different page layouts 1600 and 1610 are shown in FIGS. 16A and 16B, respectively. Graphic objects 1650, 1660, 1670, 1680 and 1690 represent content elements 350, 360, 370, 380 and 390, respectively. While the layouts in these two figures are similar, there are obvious differences in the object configuration and emphasis. For example, the different contrast used in FIG. 16B enhances the emphasis put on the text object 1675, when compared with the object 1670 in FIG. 16A.

Figure 15B:
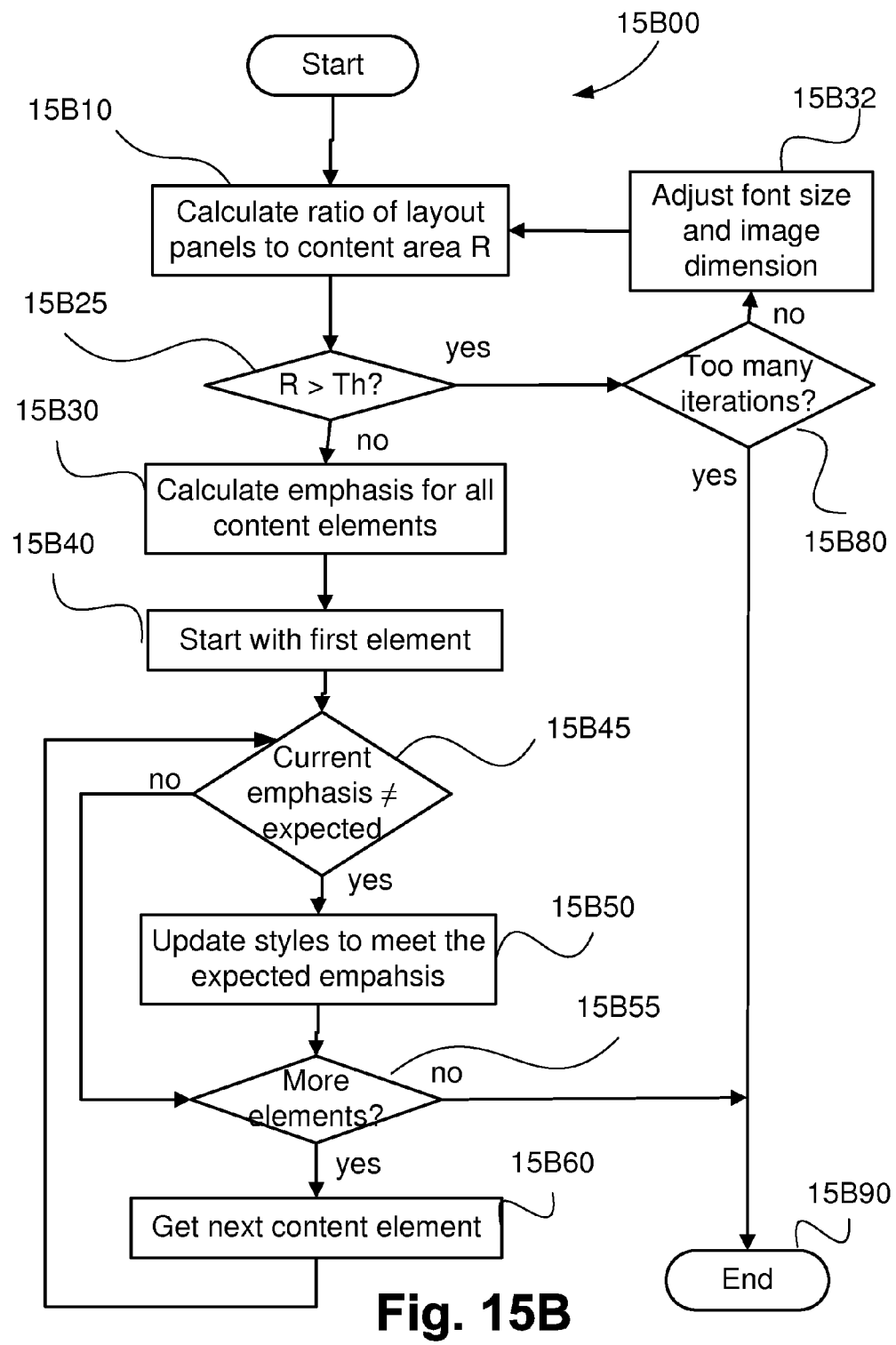
FIG. 15B is a flowchart for a method of adjusting layout styles.

Now step 15A90 of adjusting the layout stiles is described in detail in relation to one embodiment of the disclosed method, as shown in FIG. 15B.

The method 15B00, effecting the step 15A90, starts at step 15B10, in which a ratio R is calculated by the processor 105 of the area of the layout panels to the content area. The content area is the area occupied during the layout process. The processor 105 then compares, in step 15B25, the ratio R with a threshold value Th defined in 7A50. Ideally, the content area should be evenly distributed in the layout panels and the ratio R should be 1. However, an exact fit may not be possible for some circumstances because of the text lengths and random shapes of the layout panels. In this case, an extra space (e.g., 20%) in the layout panels, not occupied by any content, is allowed. For example, Th can be assigned a value of 1.2. If at step 15B25, R is found to be greater than Th, there is too much empty region left. The method is executed by the processor 105 to go, via step 15B80, to step 15B32 to adjust the font sizes and/or image sizes of content elements. Otherwise, the method continues to step 15B30 of calculating the emphasis for each content element.

In step 15B32, processor 105 recalculates the font size for each text content element, and the width and height of each image in proportion to the ratio R. However, the content area also needs to be recalculated using the new font sizes and image widths and heights. If the new content area is bigger than the layout panels, the sizes need to be decreased. The calculation of the sizes can be iterative until the content area is smaller than the empty spaces of the layout panels and the new ratio R is close to Th. If no new sizes can be obtained after limited iterations, as checked at step 15B80, the original sizes are used. That means the ratio R stays the same. If the number of iterations to adjust font sizes and image dimensions 15B32 is larger than a predefined limited number, the method concludes at step 15B90. If the number of iterations to adjust font sizes and image dimensions 15B32 is smaller than a predefined limited number, the method goes to step 15B32.

Once the sizes of the text and images are fixed, step 15B30 calculates the emphasis of each content element using formula (4) or (6). Then step 15B40 selects first content element and its emphasis. In the decision step 15B45, the processor 105 checks the current emphasis of the selected content element and its expected emphasis. If they are different, the method is executed to continue to step 15B50. Otherwise, the method proceeds to step 15B55 to get next content element.

In step 15B50 the processor 105 updates the styles specified in formula (4) or (6) to obtain a new emphasis. For a text content element, if the current emphasis is lower than the expected emphasis, some of the styles, $PT_i$ need to be increased. If the current emphasis is higher than expected emphasis, some of the styles, $PT_i$ needs to be decreased. In the example shown in 1600, styles for 1670 with emphasis A needs to be changed to raise the level of emphasis higher than emphasis of 1660 (emphasis B). If the text area for 1670 is fixed, its text area percentage to total content area $PT_1$ and the text formatting boundary $PT_5$ are fixed. Thus, the emphasis of the text can be updated according to changes in the contrast $PT_2$, text formatting boundary border $PT_3$ and border contrast $PT_4$.

First, contrast $PT_2$ is considered, i.e., increasing or decreasing the contrast $PT_2$ of the selected content element according to its expected emphasis. For example, graphic object 1670 for page layout 1600 is changed to have higher contrast as shown in 1675 for a page layout 1610. Note that the font colour selection for calculating the new contrast must check that the colours from avoided styles 1170 are not used. The new emphasis is calculated using the updated contrast.

If this new emphasis still does not meet the expected emphasis, the text formatting boundary border $PT_3$ is checked. If the emphasis needs to be increased, a border width is to be increased. Initially, border width is 0. Thus, no border is displayed. The border width has a maximum value of e.g., 10 pixels.

If the new emphasis with the border cannot reach the required emphasis, text boundary border contrast $PT_4$ will be updated. Increasing the border contrast will also increase the emphasis.

If all the above adjustments fail to achieve the expected emphasis, changing the text formatting boundary using a different shape is considered. A shape from the base styles 1150 is selected and scaled to fit the text. Predefined selection rules can be added to select a shape that is appropriate to the text length. Once the new text boundary is used, the style $PT_5$ is changed. The new emphasis is calculated.

Step 15B55 checks whether more content elements need their styles updated to meet their expected emphasis. If so, the method is executed by the processor 105 to proceed to step 15B60 to get the next content element and then the method returns back to step 15B45. Otherwise, the method concludes at step 15B90.

Figure 17:
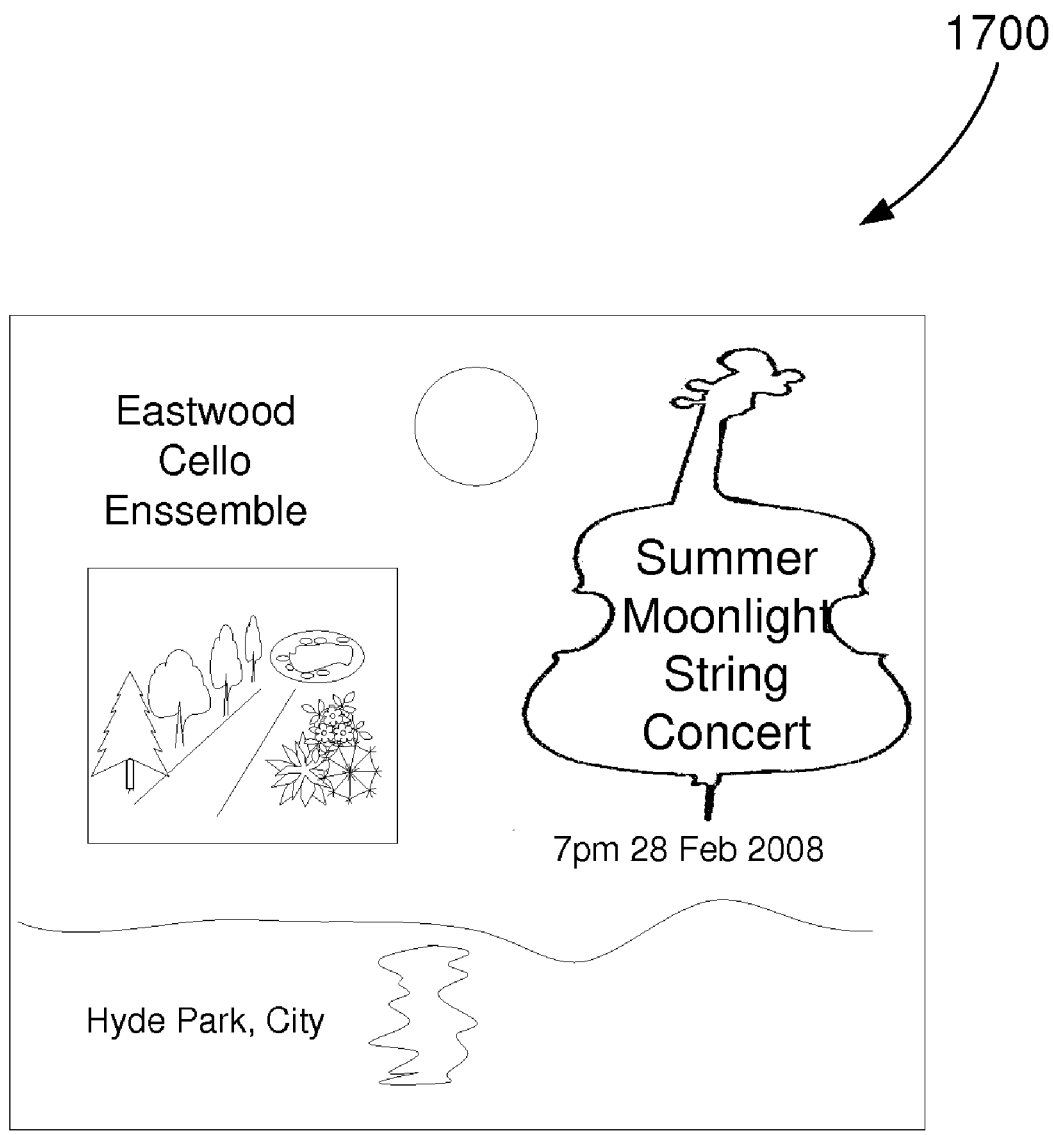
FIG. 17 is an example of a page layout as a candidate for one design concept.

FIG. 17 shows an example of a page layout created from step 250 using the relevant context image 510 as the background image and based on another relevant context image 520 as the text formatting boundary for text content 370.

Figure 18:
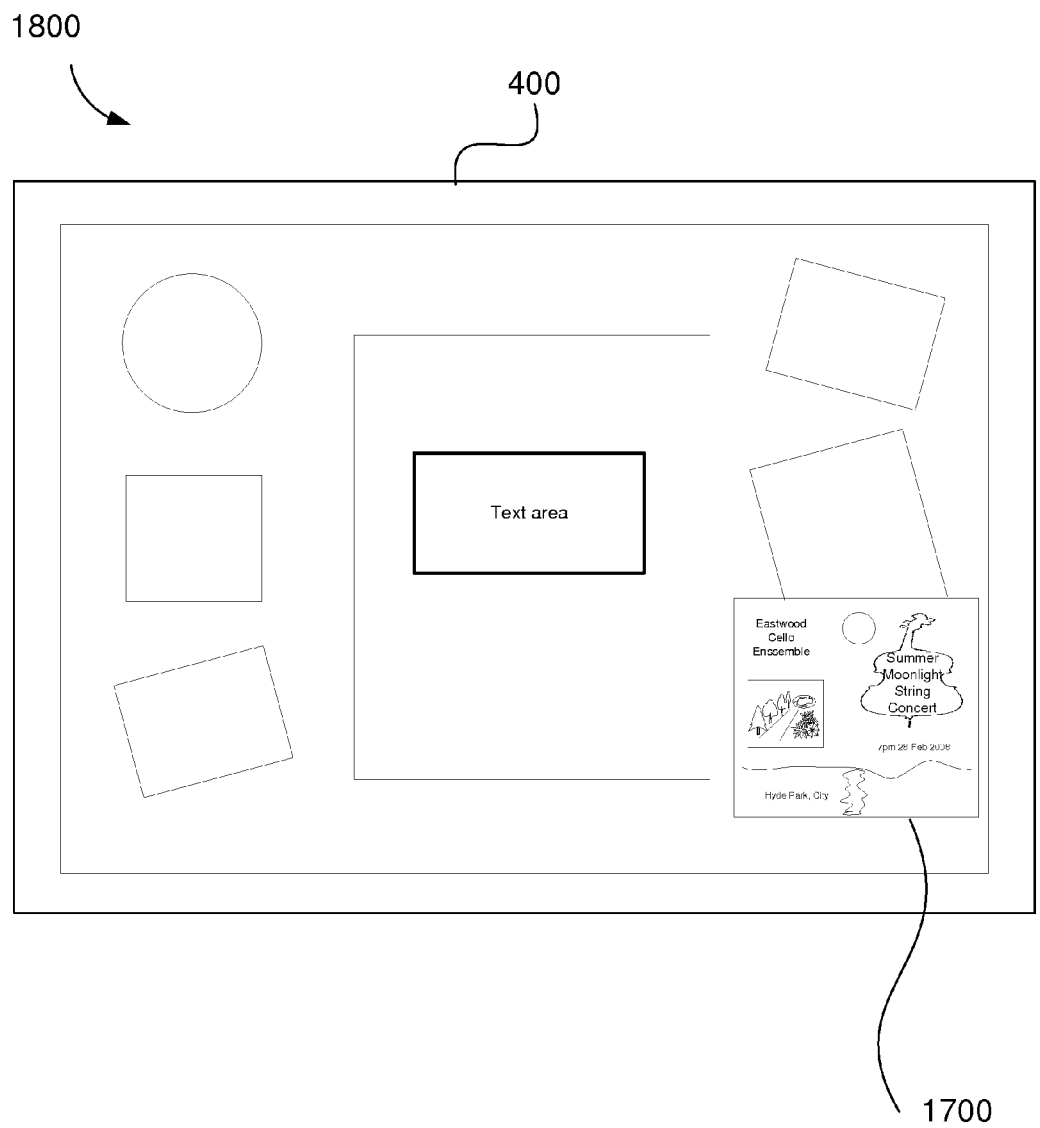
FIG. 18 shows a test of a page layout on the specified location of the external environment context image.

The page layout 1700 can be placed in the external environment context image 400 as shown in FIG. 18. This test result 1800 can be displayed to the user for evaluation, as described previously with regard to step 260.

Variations and Extensions to the Method

The foregoing text describes only some embodiments of the disclosed method for automatic generation of layout of a composite image. Modifications and/or changes can be made to the disclosed method without departing from its scope and spirit, the discussed embodiments being illustrative and not restrictive. Some examples of different specific implementations of the method are discussed further in the text.

Additional Graphic Objects

Figure 19:
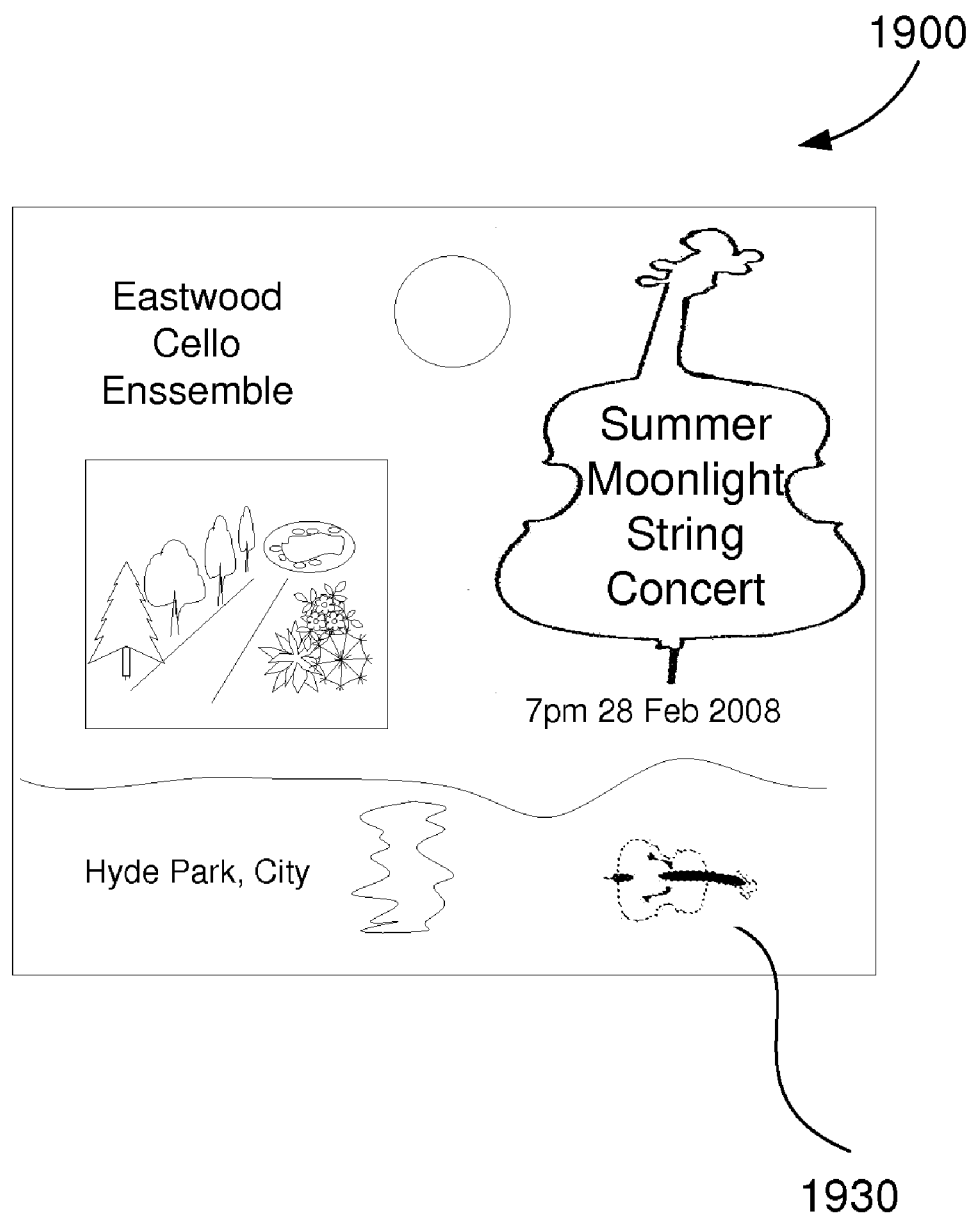
FIG. 19 is a page layout with an additional object.

In an alternative embodiment, if at step 15A75 a desired result cannot be reached for the overall look of the page layout, additional graphic objects may be laid out in a suitable position, e.g., empty space that could not be filled with any content. The additional graphic objects can include objects, such as line art and clipart, from the relevant context images or from a predefined library. It must have styles that can make the page layout look balanced, or help the layout to achieve the overall aesthetic measure. For example, the space at the bottom right corner of 1700 can be filled with a clipart object that will further improve the balance of the proposed page layout. FIG. 19 shows another example of a page layout 1900, similar to 1700, but also including a cello 1930, extracted from the relevant context image 520.

Unique Background Shape

Figure 20:
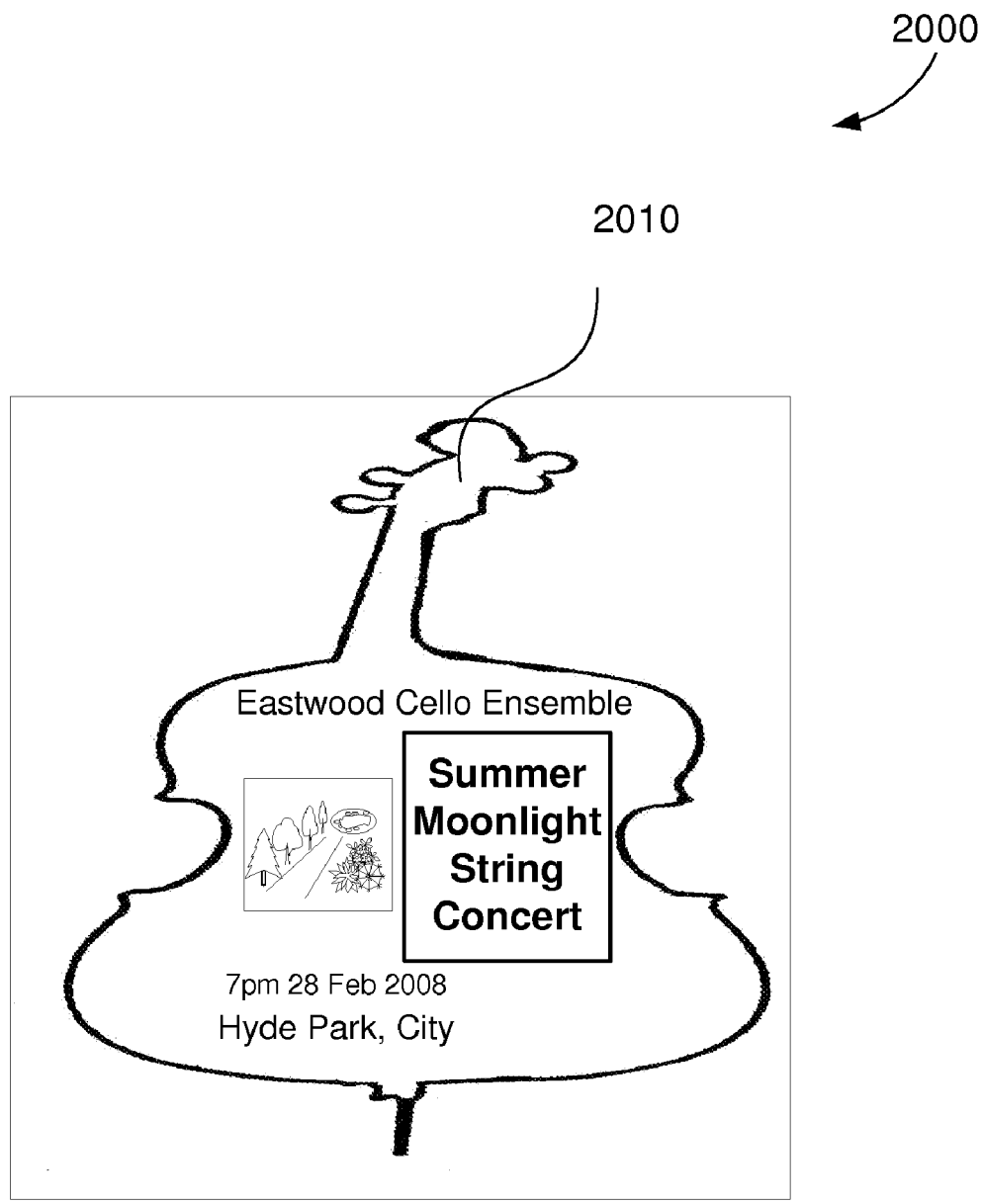
FIG. 20 is an example of a page layout with a unique background shape.

In an alternative embodiment, the step 630 can be updated to select a background shape instead of a background image. The selected shape is a region extracted from one of the relevant context images. In the particular example shown in FIG. 20, page layout 2000 includes a background in the shape of cello 2010.

Page Layout Set

In another embodiment, if the marked area 460 for the page layout in the external environment context image is too big (e.g., the ratio of available layout panel space to initial content area (e.g., $T_{ER}/T_{CA}$, see (1) is greater than 100), the main page layout can be split into multiple sub-page layouts. Step 640 can be updated to lay out content in multiple sub-pages.

Each sub-page layout, when considered individually, and all sub-page layouts, when considered as a set, must pass the predefined aesthetic criteria. This requires the inspection of the overall look at 15A75 to be conducted both on each individual sub-page layout and on the combined page layout set.

Figure 21A:
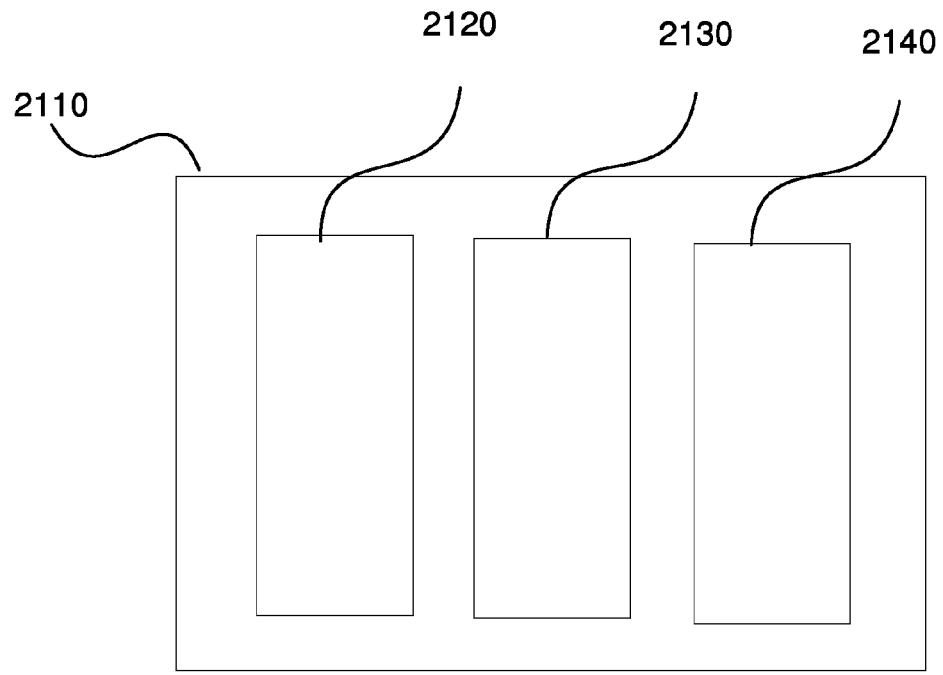
FIG. 21A and FIG. 21B illustrate different page layout sets.
Figure 21B:
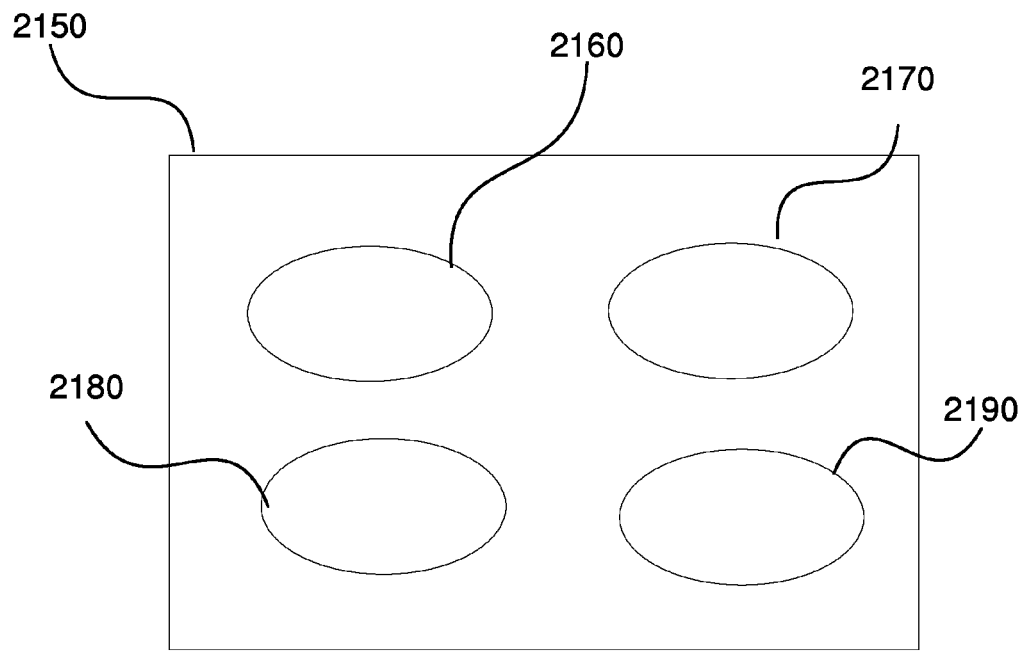

The positioning of each sub-page layout is determined by predefined rules. FIGS. 21A and 21B show two page layout sets 2110 and 2150, respectively. The page layout set 2110 has three rectangular sub-pages 2120, 2130 and 2140 while the page layout set 2150 has four oval shaped sub-pages 2160, 2170, 2180 and 2190. The selection of shapes for the sub-pages and the background colour for the page layout sets 2110 and 2150 must also follow the layout styles 1100.

External Environment Context Used for Different Purposes

In the above disclosure, the external environment context is used to extract avoided styles 1170 because the page layout is required to stand out from the environment context. However, in different occasions the external environment context image can be used to create the base styles 1150 and auxiliary styles 1160 for the page layout. For example, when a page layout is for an art poster to be placed in a living room, the art poster should be harmonious with the surrounding room in terms of the colours and shapes of the objects in the room. In this case, the page layout can have layout styles including colours and shapes from the external environment context image.

Therefore, various rules on how to use the extracted styles from the external environment context image can be created to suit the purpose of the page layout design. The selection of the rules to be used in the page layout generation method can be configured in step 230, after the location and area of the page layout is marked on the external environment context image.

Layout Space Based on Background Image Emphasis

In some applications of the method, at least a portion of a content image may be utilised as a background image. The emphasis of the background image determines the amount of the layout space. High emphasis of the background image implies that less space from the background image can be used to lay out the content elements. In other words, more background image contents are visible or not overlaid by the content elements. When the emphasis of the background image is low, more space in the background image can be occupied by the overlaid content elements.

An example of the relationship between the emphasis of the background image and the layout space allowed is shown below:

| Background Image Emphasis | Layout Space Allowed |
|---|---|
| A | 30% |
| B | 50% |
| C | 70% |
| D | 80% |

Note that the allowed layout space $T_{AS}$, is defined as the percentage of the total space of the background image.

During the execution of the layout method 640, the area of laid-out content must not exceed the layout space allowed. In step 15A10, the font sizes of the text content elements and the image dimensions are multiplied by the ratio of layout space allowed to the initial content area ($T_{AS}/T_{CA}$). In decision step 15A75, besides the overall look being checked, the area of the laid-out content elements $T_{CA}$, is also compared with the layout space allowed $T_{AS}$. If there is too much discrepancy between $T_{CA}$ and $T_{AS}$, the method proceeds to step 15A90, via step 15A85, to adjust the font sizes and image dimensions. The discrepancy can be defined as a threshold in 7A50. The content elements can be evenly distributed across the layout panels and the content elements laid out in each layout panel are centred. Alternatively, some layout panels may be fully overlaid with the content elements while other layout panels may be left empty.

Changing Background Image to Reflect its Emphasis

When a content image is selected for a background image, its emphasis needs to be reconsidered. For example, an object may be identified in the background image called a background object (e.g., 550 and 560) that is a content element with fixed position and size. The emphasis of this image can be either disregarded or changed. Usually the emphasis of an image, selected for background image, is reduced. Since the different emphasis levels are effected by way of at least one of colour saturation, brightness and contrast, to decrease the emphasis of a background object, its appearance can be altered by methods such as desaturation (i.e., removing the colours to grey scales), reducing brightness, minimising its contrast or increasing its transparency. Other methods of reducing the emphasis of the background object can also be applied. This local modification of the background objects occurs in step 15A60, after all content elements have been laid out.

Alternatively, the entire background image can be updated to reduce the emphasis using the methods mentioned in relation to step 1330. Thus, the statistics 840 of the regions in the background image are updated. In step 1360, the assigned layout panels, 14A10, 14A20, 14A30 and 14A40, will have the modified statistics. During the execution of the method 640 of laying out content, the new statistics for all layout panels are used to calculate the emphasis of each laid-out content element.

Dynamic Change of Page Layout

If the page layout is designed for an electronic display, the page layout may be arranged to update in response to changes in the external environment context. For example, two photos can be taken of the external environment context of an electronic billboard at different times. The first photo can represent the external environment context during the day, while the second photo can represent the external environment context at night time. The photos can be received and processed by the disclosed method, either sequentially or simultaneously. As a result, two page layouts are created, each corresponding to a respective one of the two external environment context images. When the two page layouts are setup in the electronic display, one is set to be displayed for the day time and another one is for the night time.

An arrangement can also be made where photos can be taken periodically, or upon request. In this case the page layout can be dynamically adjusted in line with any changes in the respective external environment context images indicated by a respective photo obtained subsequently to the photo with the first external environment context image.

Interpretation of the Environment Visual Context in 3D

If the objects in the external environment context image can be identified relative to the page layout location in 3D space, step 620 to create layout styles may be modified to consider the styles of these objects. For example, if the layout styles require styles from the external environment context image, the styles extracted from the objects behind the page layout location may have higher priority than the styles from the objects in front of the page layout. Thus, the styles with higher priority may be added to the base style 1150 and the styles with lower priority may be added to the auxiliary styles 1160.

INDUSTRIAL APPLICATION

The described method is applicable to any industry related to advertising, marketing and commerce.

The invention claimed is:

1. An electronically implemented method for generating a layout for a composite image, the method comprising the steps of:
    receiving a plurality of content elements to be included within the composite image;
    receiving an external environment context image indicative of an intended physical environment within which the composite image is to be located, the external environment context image being captured by an image capture device;
    receiving data indicating at least one of a size of the composite image and a location of the composite image within the intended physical environment;
    determining layout styles for the content elements based on features of the content elements, at least one feature of the intended physical environment as determined from the external environment context image, and the received data; and
    generating a layout of the content elements within the composite image, based on the determined layout styles.

2. A method according to claim 1, further comprising the step of:
    providing one or more relevant context images, each relevant context image being associated with one or more of the plurality of content elements;
    wherein the step of determining layout styles for the content elements is also based on features of at least one of the one or more relevant context images.

3. A method according to claim 2, wherein at least a portion of one of the one or more relevant context images is included in the composite image.

4. A method according to claim 2, wherein the determining of the layout styles comprises the steps of:
    extracting one or more regions or objects from the content elements, relevant context images and the external environment context image;
    creating initial layout styles based on features of an extracted region or object;
    adjusting the initial layout styles by comparing them with extracted styles from the external environment context image; and
    accessing additional layout styles that are in compliance with predefined selection criteria with respect to color, font or shape, for use as a text formatting boundary.

5. The method according to claim 4, wherein:
    the step of extracting one or more regions or objects from the content elements, the relevant context images and the external environment context image, is based on statistics calculated for regions using image segmentation techniques, wherein the extracted regions are classified into text regions, object regions and simple regions; and
    the initial layout styles are created from the statistics calculated for the extracted regions or objects.

6. A method according to claim 2, wherein the generating of the layout comprises the steps of:
    selecting from the relevant context images a background shape to define a background within the composite image; and
    laying out the plurality of content elements on the background defined by the background shape.

7. A method according to claim 1, wherein features of the external environment context image include at least one of:
    a color of the external environment context image;
    an object shape in the external environment context image;
    a background texture of the external environment context image; and
    a font of a text region in the external environment context image.

8. A method according to claim 1, further comprising the step of:
    receiving additional information relating to an occasion associated with the display of the composite image,
    wherein the generating of the layout is also based on the received additional information.

9. A method according to claim 1, wherein the generating of the layout comprises the steps of:
    selecting from the relevant context images, a background image to define a background within the composite image; and
    laying out at least one of the content elements on the background defined by the background image.

10. A method according to claim 9, wherein selecting a background image comprises the steps of:
    selecting an image from the plurality of content elements and the relevant context images;
    extracting non-text regions from the selected image;
    if there is enough space in the non-text regions to fit at least one of the content elements, choosing the selected image to be the background image; and
    initializing non-text regions as layout panels and ordering them in a layout flow.

11. A method according to claim 10, wherein laying out content elements on the selected background image comprises the steps of:
    initializing layout styles;
    initializing layout panels;
    laying out content elements in the layout panels according to the layout flow to produce the composite image;
    inspecting the overall look of the composite image; and
    if the composite image does not meet a predefined aesthetic criteria, adjusting styles to generate another composite image.

12. A method according to claim 11, further comprising including additional graphics objects in the background image for improving an overall layout of the composite image, the overall layout being evaluated according to the predefined aesthetic criteria.

13. A method according to claim 1, the method comprising creating a plurality of sub-page layouts which combine to define a page layout of the entire composite image.

14. A method according to claim 1, wherein the layout styles for the plurality of content elements are determined so as to create contrast with the external environment context image.

15. A method according to claim 1, wherein at least one content element is presented in the generated layout on the basis of a respective emphasis level assigned to the element.

16. A method according to claim 15, wherein different emphasis levels amongst the content elements are effected by way of at least one of color saturation, brightness and contrast.

17. A method according to claim 1, further comprising creating a page layout with a background that comprises at least a portion of one content element.

18. A method according to claim 17, further comprising one of changing and discarding an emphasis level associated with a content element, at least a portion of which is used as a background, during creation of the page layout.

19. A method according to claim 1, wherein the page layout obtained on the basis on a first external environment context image is dynamically adjusted on the basis of a subsequently obtained second external environment context image.

20. A method according to claim 1, wherein a plurality of external environment context images are simultaneously received and a plurality of composite images are generated, each composite image corresponding to a respective external environment context image.

21. A method according to claim 1, further comprising identifying objects in the external environment context image relative to a layout location in 3D space, of the composite image, and giving styles of objects located behind the layout location a higher priority compared to styles of objects located in front of the layout location.

22. A method according to claim 1, wherein at least one of the content elements comprises text.

23. A method according to claim 1, the method further comprising at least one of displaying and printing the generated composite image.

24. A method according to claim 1, wherein the step of generating the layout further comprises an automated inspection of the overall look of the generated layout.

25. A non-transitory computer readable medium having a computer program recorded thereon and executable to generate a composite image, the program comprising:

executable code for receiving a plurality of content elements;

executable code for receiving an external environment context image indicative of an intended physical environment within which the composite image is to be located, the external environment context image being captured by an image capture device;

executable code for receiving data indicating at least one of a size of the composite image and a location of the composite image within the intended physical environment;

executable code for determining layout styles for the content elements within the composite image based on features of the content elements, at least one feature of the intended physical environment as determined from the external environment context image, and the received data;

executable code for generating a layout of the content elements within the composite image based on the determined layout styles; and executable code for generating the composite image by laying out at least the content elements according to the generated layout.

26. Electronic system for generation of a composite image, the system comprising;

a communication unit for receiving a plurality of content elements;

a communication unit for receiving an external environment context image indicative of the intended physical environment within which the composite image is to be located, the external environment context image being captured by an image capture device;

a communication unit for receiving data indicating at least one of a size of the composite image and a location of the composite image within the intended physical environment;

a processing unit for determining layout styles for the content elements within the composite image, based on features of the content elements, at least one feature of the intended physical environment as determined from the external environment context image, and the received data; and a processing unit for generating a layout of the content elements within the composite image based on the determined layout styles; and a processing unit for generating the composite image by laying out at least the content elements according to the generated layout.

* * * * *